United States Patent
Onusko et al.

(10) Patent No.: US 11,962,560 B2
(45) Date of Patent: Apr. 16, 2024

(54) TECHNIQUES FOR SUPERVISING COMMUNICATIONS FROM MULTIPLE COMMUNICATION MODALITIES

(71) Applicant: Actiance, Inc., Redwood City, CA (US)

(72) Inventors: John Onusko, Garden Valley, CA (US); Gopalakrishnan Ramanujam, San Ramon, CA (US); Jonathan Rudolph, Parsippany, NJ (US)

(73) Assignee: ACTIANCE, INC., Redwood City, CA (US)

( * ) Notice: Subject to any disclaimer, the term of this patent is extended or adjusted under 35 U.S.C. 154(b) by 0 days.

(21) Appl. No.: 17/744,111

(22) Filed: May 13, 2022

(65) Prior Publication Data

US 2022/0278953 A1    Sep. 1, 2022

Related U.S. Application Data

(63) Continuation of application No. 17/113,681, filed on Dec. 7, 2020, now Pat. No. 11,336,604, which is a
(Continued)

(51) Int. Cl.
*G06F 16/2455* (2019.01)
*H04L 51/216* (2022.01)
(Continued)

(52) U.S. Cl.
CPC ........ *H04L 51/42* (2022.05); *G06F 16/24562* (2019.01); *H04L 51/216* (2022.05); *H04L 51/224* (2022.05); *H04L 51/52* (2022.05)

(58) Field of Classification Search
CPC ..... H04L 51/42; H04L 51/224; H04L 51/216; H04L 51/52; G06F 16/24562
See application file for complete search history.

(56) References Cited

U.S. PATENT DOCUMENTS 6,564,263 B1    5/2003  Bergman
7,058,699 B1    6/2006  Chiou et al.
(Continued)

OTHER PUBLICATIONS

Dalila Mekhaldi—"Multimodal Document Alignment: towards a Fully-indexed Multimedia Archive"—SIGIR'07, Jul. 23-27, 2007, Amsterdam, The Netherlands. Copyright 2007 ACM—multimedia information retrieval workshop, SIGIR, 2007—rgcl.wlv.ac.uk—pp. 1-7.
(Continued)

*Primary Examiner* — Christopher B Robinson
(74) *Attorney, Agent, or Firm* — Morris, Manning & Martin, LLP; Daniel E. Sineway; Adam J. Thompson

(57) ABSTRACT

Disclosed herein is a computing device and data store for use in the storage and retrieval of communication objects. The computing device can receive a first communication sent using a first communication modality and a second communication sent using a second communication modality. The computing device can determine that the first communication and the second communication correspond to a single interaction. The computing device can generate a communication object with a communications in a particular structure consistent across communication modalities using the first communication and the second communication. The computing device can determine contexts from the communication object and store the communication object in a database with the contexts. The computing device can retrieve the communication object in response to a search request based on the contexts.

20 Claims, 18 Drawing Sheets

Related U.S. Application Data continuation of application No. 15/799,993, filed on Oct. 31, 2017, now Pat. No. 10,880,254.

(60) Provisional application No. 62/415,461, filed on Oct. 31, 2016.

(51) Int. Cl.
  *H04L 51/224* (2022.01)
  *H04L 51/42* (2022.01)
  *H04L 51/52* (2022.01)

(56) References Cited

U.S. PATENT DOCUMENTS

| | | | |
|---|---|---|---|
| 7,143,091 B2 | 11/2006 | Charnock et al. | |
| 7,761,471 B1 | 7/2010 | Lee et al. | |
| 8,041,675 B1 | 10/2011 | McCain | |
| 8,881,304 B2 | 11/2014 | Vrielink et al. | |
| 9,589,043 B2 | 5/2017 | Onusko | |
| 2003/0182310 A1 | 9/2003 | Charnock | |
| 2003/0188264 A1 | 10/2003 | Nawathe et al. | |
| 2003/0220917 A1 | 11/2003 | Copperman et al. | |
| 2003/0229900 A1 | 12/2003 | Reisman | |
| 2004/0025110 A1 | 2/2004 | Hu | |
| 2004/0034834 A1 | 2/2004 | Pirie et al. | |
| 2004/0064430 A1 | 4/2004 | Klein et al. | |
| 2005/0060220 A1 | 3/2005 | Beringer | |
| 2005/0193102 A1* | 9/2005 | Horvitz | H04L 67/14 709/228 |
| 2005/0216503 A1 | 9/2005 | Charlot et al. | |
| 2005/0278340 A1 | 12/2005 | Rehberg et al. | |
| 2006/0143034 A1 | 6/2006 | Rothermel et al. | |
| 2007/0022050 A1 | 1/2007 | Cornaby et al. | |
| 2007/0150253 A1 | 6/2007 | Dougherty et al. | |
| 2008/0010629 A1 | 1/2008 | Berg et al. | |
| 2008/0065471 A1 | 3/2008 | Reynolds | |
| 2008/0118051 A1 | 5/2008 | Odinak et al. | |
| 2008/0195576 A1 | 8/2008 | Sande et al. | |
| 2009/0254572 A1 | 10/2009 | Redlich et al. | |
| 2009/0265329 A1 | 10/2009 | Korupolu et al. | |
| 2009/0287665 A1 | 11/2009 | Prahlad et al. | |
| 2010/0138756 A1 | 6/2010 | Saund et al. | |
| 2010/0250497 A1 | 9/2010 | Redlich et al. | |
| 2010/0257140 A1 | 10/2010 | Davis et al. | |
| 2011/0010761 A1 | 1/2011 | Doyle | |
| 2011/0119730 A1 | 5/2011 | Eldar et al. | |
| 2011/0122866 A1 | 5/2011 | Vasamsetti et al. | |
| 2011/0184935 A1 | 7/2011 | Marlin | |
| 2011/0202947 A1 | 8/2011 | Gupta | |
| 2011/0208816 A1* | 8/2011 | Chavez | H04L 51/08 709/206 |
| 2011/0302025 A1 | 12/2011 | Hsiao et al. | |
| 2012/0047483 A1 | 2/2012 | Amit et al. | |
| 2012/0079099 A1* | 3/2012 | Dhara | G06Q 10/107 709/224 |
| 2012/0197871 A1 | 8/2012 | Mandel et al. | |
| 2012/0200567 A1 | 8/2012 | Mandel et al. | |
| 2012/0330869 A1 | 12/2012 | Durham | |
| 2013/0024492 A1 | 1/2013 | Graff et al. | |
| 2013/0080547 A1 | 3/2013 | Levien et al. | |
| 2013/0173284 A1 | 7/2013 | Hyde | |
| 2013/0173305 A1 | 7/2013 | Hyde | |
| 2013/0179188 A1 | 7/2013 | Hyde | |
| 2013/0203038 A1 | 8/2013 | Kumar et al. | |
| 2013/0254226 A1 | 9/2013 | Read | |
| 2013/0262420 A1 | 10/2013 | Edelstein et al. | |
| 2013/0331071 A1* | 12/2013 | Statler | H04W 4/021 455/414.2 |
| 2014/0032500 A1* | 1/2014 | Wibbeler | G06F 16/93 707/661 |
| 2014/0040264 A1 | 2/2014 | Varadan | |
| 2014/0100128 A1 | 4/2014 | Narain et al. | |
| 2014/0143018 A1 | 5/2014 | Nies | |
| 2014/0214524 A1* | 7/2014 | Senaratna | G06Q 30/018 705/14.41 |
| 2014/0278663 A1 | 9/2014 | Samuel | |
| 2014/0279588 A1 | 9/2014 | FitzGerald | |
| 2014/0343973 A1 | 11/2014 | Ruszala | |
| 2015/0012490 A1* | 1/2015 | Forsythe | G06F 16/90 707/613 |
| 2015/0033139 A1 | 1/2015 | Thiel et al. | |
| 2015/0039565 A1* | 2/2015 | Lucas | H04L 63/10 707/667 |
| 2015/0046565 A1 | 2/2015 | Otus et al. | |
| 2015/0046989 A1 | 2/2015 | Oberheide et al. | |
| 2015/0074579 A1 | 3/2015 | Gladstone et al. | |
| 2015/0205770 A1 | 7/2015 | Shershevsky et al. | |
| 2015/0271188 A1 | 9/2015 | Call | |
| 2015/0339370 A1 | 11/2015 | Onusko et al. | |
| 2016/0050565 A1 | 2/2016 | Benoit et al. | |
| 2016/0100531 A1 | 4/2016 | Asherman | |
| 2016/0110284 A1 | 4/2016 | Athalye et al. | |
| 2016/0219084 A1 | 7/2016 | Abiezzi | |
| 2019/0306094 A1 | 10/2019 | Liu et al. | |

OTHER PUBLICATIONS

Harry Bunt et al.—"Fusion and Coordination for Multimodal Interactive Information Presentation—Roadmap, Architecture, Tools, Semantics"—Intelligent Information Presentation, 2003 Kluwer Academic Publishers. Printed in The Netherlands—Multimodal Intelligent Information Presentation, vol. 27, 2005—Springer—academia.edu—pp. 1-17.

* cited by examiner

Alcatraz® | Administration | Archive Management | Case Management | Supervision | Ramanujam, Gopal | Admin ▼

Review > Supervision Demo

- Dashboards
  - Supervision
- My Review Queues
  - Queue
  - Review
  - Archive Search
  - Experts
- Configure
  - Tap Groups
  - Policies
  - Queries

Available Filter

Review Result

- Supervised Participants
  - akean@enron.com (129)
  - Paul.kauman@ENRON.com...
  - Grager.Dennis@enron.com...
  - Eloeth.Lannel@enron.com....
  - Bryan.styline@enron.com..
  - Lesline.Lawner@enron.com..
  - Kevin.myhatt@enron.com (34)
  - Dennis.Fusicon@enron.com...
  - Whaltey, Greg (29)
  - John.Amber@ENRON.com (29)
- Supervised Groups
  - Group_is (361)
  - Key Executes (183)
  - Group (2)
- Networks
  - Journal (441)
  - Enange (1)

[Confirm]

Documents 445 (0.13 seconds)

◄ Prev  Next ▶ Claim ▼ Release ▼ Update ▼ Assign ▼ Exclose ▼ Close ▼ Track Action Status  Export ▼

| | Subject | From | To/Cc/Bcc | Network | Date | State | Las Updated | Action Tag |
|---|---|---|---|---|---|---|---|---|
| ☐ | John you have 1 invita.. notification.. | | Action John... | Journal | Jun 14.. | New | 4 Months 3... | |
| ☐ | John you have 1 invita.. notification.. | | Action John... | Journal | May 17.. | New | 4 Months 3... | |
| ☐ | FINAL Document letter.. | jeff.dascrail.. | harvey.kinger.. | Journal | Jun 02.. | New | 4 Months 3... | |
| ☐ | October London Meetin.. | suzante_m.. | May@enron.. | Journal | Jun 04.. | New | 4 Months 3... | |
| ☐ | Meltaburg | | jeff.dascrail.. | Jamesh.steff.. | Journal | May 30.. | New | 4 Months 3... |
| ☐ | Comprehended Solutio.. | jeff.dascrail.. | alex.goldbar.. | Journal | May 18.. | New | 4 Months 3... | |
| ☐ | October London Meeti.. | strezen@e.. | May@enron.. | Journal | Jun 04.. | New | 4 Months 3... | |
| ☐ | Follow-up with Hettdeg.. | miyug.butt.. | Jamesh.steff.. | Journal | May 21.. | New | 4 Months 3... | |
| ☐ | Energy Issue | | jeff.dascrail.. | Albert.conne.. | Journal | Apr 09.. | New | 4 Months 3... |

First  Previous  1  2  3  4  5  6  7  8  9  Next        1-50 of 443

Details        Query Hint | Abc.. | Abc..

| Content | Action Event | Policy Event | Matched Policy | Matched Participant Group | Transcript D.. |

▼ Nework Journal | Chennai Email | Participant | Audit History

Fri 18 May 2001 04:50:00 0700 ()PDT
From: jeff.desuvich@enron.com
To: sthysal@enron.com, Dualy@dule.energy.com, lyne.ajello...

Tuse are the marecoin that lay used an hat not cisussion with california business leader. the word documents was provide as background. Please seem confidence and if I've....

Date: Jun 26 2017 20:51:36
Username: System
Status: New

920

922

```
Documents
Details
«Prev   Next»   Claim»   Release»   Update»   Assign»   Exclase»   Close»

Content | Action Event | Policy Event | Matched Policy | Matched Participant Group | Transcript Details | Source View Message id: <14917879.1075863380533.JavaMail.evant@thyme>
Date: Mon, 15 Oct 2001 12:35:36 0700 (PDT)
From: ginscorteselli@enron.com
To:    ben.glissan@enron.com, leff.den@enron.com, nccarty.danny@enron.com,
       deliney.dave@enron.com, duran.dave@enron.com, coxdavisd@enron.com,
       dietrich.janet@enron.com, jeffrey.ncahon@enron.com, shankman.jeff@enron.com,
       jim.fallon@enron.com, hughes.jim@enron.com, joe.gold@enron.com,
       lavorato.john@enron.com, lousi.kitchen@enron.com, needlcke@enron.com,
       matthew.scrimshaw@enron.com, london.brown@enron.com, mike.mnconnell@enron.com,
       raymond.bowen@enron.com, richard.shapiro@enron.com, rich.nuy@enron.com,
       rob.milnthorp@enron.com, tin.belden@enron.com, wes.colwel@enron.com
```
} 940

```
Subject: Minutes of 11 October 2001 PRC Cogitative Meeting
Cc: david.oxtey@enron.com, cindyolson@enron.com
Alne Version 1.0
Content - Type: text/planin charset=us-asdi
Content - Transfer - Encoding 7bit
Bcc: david.oxtey@enron.com, cindy.olson@enron.com
X-From: cortsell, oin <0.ENRON-CN-RECIPIENTS/CN-GCONTEST>
X-To: Blism, Ben </0.ENRON-CN-RECIPIENTS/ON-BULISAN>, Dan Jeff <dleff@enron.com>, Denny McCart <dmccarty@enron.com>, Dave Delainey <ddelainz
@enron.com> Dave Duran <wduran@enron.com>, David Cox <david.cox@enron.com>, Jannet Dietrich <jdietri@enron.com>, McMalum
Jeffrey </de-ENRON-CN-NA/CN_RECIPETS/C...>
```
} 950

FIG. 9B

Documents
Details

« Prev | Next » | Claim ▾ | Release ▾ | Update ▾ | Assign ▾ | Exclase ▾ | Close ▾

| Content | Action Event | Policy Event | Matched Policy | Matched Participant Group | Transcript Details | Source View |

{ 950

X-To: Blism, Ben </O.ENRON/CN=RECIPIENTS/CN=BULISAN>, Dan Ieff <dieff@enron.com>, Denny McCart <dmccarty@enron.com>, Dave Delainey <ddelainz@enron.com>,Dave Duran <wduran@enron.com>, David Cox <david.cox@enron.com>, Jannet Dietrich <jdietri@enron.com>, McMaium Jeffrey </de-ENRON-CN=NA/CN _RECIPIETS/CN=JMOWHO>, jeff shankee <jshankn@enron.com> , Fallon, Jim </O=ENRON-CN=NA/CN_RECIPIETS/CN=JFALLOW>, JIM Mughes <hughes@enron.com>, Gold joe </O=ENRON-CN=NA/CN_RECIPIETS/CN=JGOLD>, John Lavorato <Kimberley.hills@enron.com>, kitchen, Louise </O-ENRON-CN=NA/CN_RECIPIETS/CN=Jkitchen>, Mark ---edicine <mark.e.hardick@enron.com>, Scrimshaw, Mattiwe </O-ENRON-CN=NA/CN_RECIPIETS/CN=MSCRIMSH>, Brown Michal - Coo London </O-ENRON-CN=NA/CN_RECIPIETS/CN=RBOWEN>, Shapiro, Errichard </O-ENRON-CN=NA/CN_RECIPIETS/CN=RSHPIRO>, Buy, Rick Minrthorp, Rob </O-ENRON-CN=NA/CN_RECIPIETS/CN=RHILNTH>, Belden, TIM </O-ENRON-CN=NA/CN_RECIPIETS/CN=TBELDEN>, Colwell, ves </O-ENRON-CN=NA/CN_ RECIPIETS/CN=MCOLIWEL>
X-CC: Oxtay, David </O-ENRON-CN=NA/CN_RECIPIETS/CN=DOXLEY>, Olsen, Cindy </O-ENRON-CN=NA/CN_RECIPIETS/CN-Culson>
X-bcc:
X-Folder: \RBUY (Non-Privileged)\Buy, Rich\Inbox
X-Origin: Buy-R
X-Filename: Rbuy (Non-Privilged)-pst

{ 960

***********************Content-Type: Text/Plain***********************

The Following compiles the minutes of the PRC Committee Meeting of 11 October, and the templates for PRC recommendation provider to the HR Vp's for meeting with their OTC's Please don't hesitate to contact we should you have any questions or concern.
Gina Cortesell

FIG. 9C

Alcatraz® | Administration | Archive Management | Case Management | Supervision | Ramanujam, Gopal | Admin | ▼

Review > Supervision Demo

Dashboards
- Supervision

My Review Queues
- Queue

Review

Archive Search
- Experts

Configure
- Tap Groups
- Policies
- Queries

Available Filter | Review Result
- Supervised Participants
  - Action, John (2)
- Network
  - MicrosoftUC (2)
- Channels
  - IM (2)
- Director of Communication
  - Internal Only (2)
- Text Extraction Status
  - No Issue (2)
- Policy Type
  - JSON test (2)
- Supervised Participants
  - Action, John (2)

[Confirm]

Documents 2,021 (0.30 seconds)

« Prev  Next ▸  Claim ▸  Release ▸  Update ▸  Assign ▸  Exclose ▸  Close ▸  Track Action Status  Export ▸

| ☐ Subject | From | To/Cc/Bcc | Network | Date | State | Last Updated | Action Tag |
|---|---|---|---|---|---|---|---|
| ☐ Conversation Ajected... | jactor@ach... | cmarty@... | MicrosoftUC | Jun 20.. | New | 4 Months 3... | |
| ☐ Conversation Ajected... | cmarty@ach. | jactor@... | MicrosoftUC | Jun 20.. | New | 4 Months 3... | |

First  Previous  1  Next                                                              1-2 of 2

Details                                     Query Hints | ABCD. | ABCD.

Content | Action Event | Policy Event | Matched Policy | Matched Participant Group | Transcript D.
Display Format  ☐ Rich test   Show Events  ☐ Join Lease  ☐ Disclaimer  ☐ Other  Audit History ▸ Network: MicrosoftUC    Channel: IM            Participants: 2        Date:      Jun 26 2017 20:51:35

Jun 20 2016 : 12:28:04   jaccon@act-ms.com                               Username:  System
Jun 20 2016 : 12:28:42   cmarty@act-ms.com   Hi OCT, read me the Proje....  Status:   New
                                             Thank you Let's keep it to
                                             question for now
Jun 20 2016 : 12:28:52   jaction@act-ms.com  ok
Jun 20 2016 : 12:29:06   cmarty@act-ms.com   Thank  —1022

TECHNIQUES FOR SUPERVISING COMMUNICATIONS FROM MULTIPLE COMMUNICATION MODALITIES

CROSS-REFERENCES TO RELATED APPLICATIONS

This application is a continuation of U.S. application Ser. No. 17/113,681, entitled "TECHNIQUES FOR SUPERVISING COMMUNICATIONS FROM MULTIPLE COMMUNICATION MODALITIES," filed Dec. 7, 2020, which is a continuation of U.S. application Ser. No. 15/799,993 now U.S. Pat. No. 10,880,254, entitled "TECHNIQUES FOR SUPERVISING COMMUNICATIONS FROM MULTIPLE COMMUNICATION MODALITIES," filed Oct. 31, 2017, which claims the benefit of and priority to U.S. Provisional Patent Application No. 62/415,461, filed on Oct. 31, 2016, each of which are incorporated herein by reference in their entireties.

BACKGROUND

Technology has made access to communications easier than ever now that almost every mode of communication is digital. Accordingly, enterprises have begun to supervise communications from employees to ensure compliance with requirements of the enterprises. For example, some enterprises enforce regulatory requirements that prohibit certain communications to be sent from employees. However, the number of communications for an enterprise in even a single day may be overwhelming. Therefore, there is a need in the art for improved techniques for supervising communications.

SUMMARY

The present disclosure generally relates to supervising communications, and more particularly to a multi-system environment that facilitates a more efficient supervision process.

In certain embodiments, the environment may include a communication capture system, an archive system, and a supervision system. The communication capture system may receive communications from multiple communication modalities. The communications from one or more communication modalities may be determined to be a single interaction. For example, a first communication may be sent from a first user to a second user, and a second communication may be sent from the second user to the first user in response to the first communication. In such an example, the first communication and the second communication may be designated as an interaction.

The communication capture system may generate a communication object for each communication (or for each interaction), where a structure of a communication object may be consistent across different communication modalities. The communication capture system may store communication objects in the archive system.

The supervision system may access the archive system to determine whether a communication object should be reviewed. For example, the supervision system may identify a policy defining which communication objects to review. Based upon the policy, and in response to communication objects being stored in the archive system, the supervision system may add references to the communication objects to one or more queues, where each queue is indicative of a list of one or more communications that need to be reviewed.

The supervision system may expose (or provide) a user interface (e.g., a graphical user interface (GUI) or an application programming interface (API)) for users to access queues maintained by the supervision system. In one illustrative example, the user interface may be a graphical user interface in the form of a web page. The web page may provide an option to a reviewing device to review a queue that has been assigned to or selected by the reviewing device. Upon selection of the option, the supervision system may identify a reference for a communication object that is the next communication object in the queue.

In some examples, the supervision system may retrieve the communication object using the reference. In such examples, the supervision system may then add information from the communication object to the web page and send the web page to the reviewing device. In other examples, the supervision system may cause, using the reference, the archive system to send information from the communication object to the reviewing device such that the information may be output by the reviewing device.

The information from the communication object may be a representation of an interaction. In some examples, the information may be used to reconstruct portions of one or more communications from the interaction in a viewable form.

Provided herein are techniques for providing an environment to supervise communications. The environment may include a communication capture system (sometimes referred to as a first system), an archive system (sometimes referred to as a database), and a supervision system (sometimes referred to as a second system). The techniques may include receiving, by the first system, one or more communications sent using a communication modality, where the one or more communications are determined to be a single interaction. In some examples, the one or more communications may include a first communication and a second communication, where the first communication is sent from a first user to a second user, and where the second communication is sent from the second user to the first user in response to the first communication. In such examples, the interaction may include the first communication and the second communication. The first system may be configured to receive communications from multiple communication modalities.

The first system may generate a communication object for the interaction. A structure of the communication object may be consistent across different communication modalities. The first system may store the communication object at a location in a database.

After the communication is stored at the location, the second system may identify a policy defining which communication objects to review. The policy may include search criteria, where a first search criterion of the search criteria applies to a first section of a particular communication, and where a second search criterion of the search criteria applies to a second section of the particular communication. The second system may then determine whether to review the communication object based upon the policy.

In response to determining to review the communication object, the second system may add a reference for the communication object to a queue. Adding the reference for the communication object to the queue may include adding a pointer associated with the communication object to the queue, where the pointer is indicative of the location in the database. The queue may be stored, managed, and/or maintained by the second system.

The second system may receive a request for a web page associated with the second system. The web page may be hosted by the second system. The request may be from the reviewing device. The second system, in response to the request for the web page associated with the second system, may identify one or more queues associated with the reviewing device, the one or more queues including the queue. The second system may then send the web page associated with the second system to the reviewing device. The web page may present indications of the one or more queues.

In some examples, the second system may receive a request to review a next interaction from the queue. The request may be from the reviewing device. The request to review the next interaction may be sent in response to a selection of an indication of the queue on the web page associated with the second system by the reviewing device. In response to the request, the communication object (or information from the communication object) may be output to the reviewing device.

The second system may output a representation of the interaction to a reviewing device. The representation may be output by retrieving the communication object from the location using the reference for the communication object in the queue and reconstructing portions of the one or more communications from the interaction in a viewable form using information from the communication object. Examples of the viewable form include a native form or a human-readable form for the communication modality.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

Illustrative embodiments are described in detail below with reference to the following figures.

FIG. 5 is an example of a user interface for review of a queue according to certain embodiments.

FIG. 6 is an example of a user interface for review of a filtered queue according to certain embodiments.

FIG. 7 is an example of a user interface for indicating a reason that a communication object was added to a queue according to certain embodiments.

FIG. 9A is an example of a user interface for displaying content from an email associated with a communication object according to certain embodiments.

FIGS. 9B-9C is an example of a source view of a communication object for an email according to certain embodiments.

FIG. 10A is an example of a user interface for displaying content from one or more messages in an instant messaging conversation associated with a communication object according to certain embodiments.

FIG. 11 is an example of a user interface for displaying content from a social networking page associated with a communication object according to certain embodiments.

DETAILED DESCRIPTION

Figure 1:
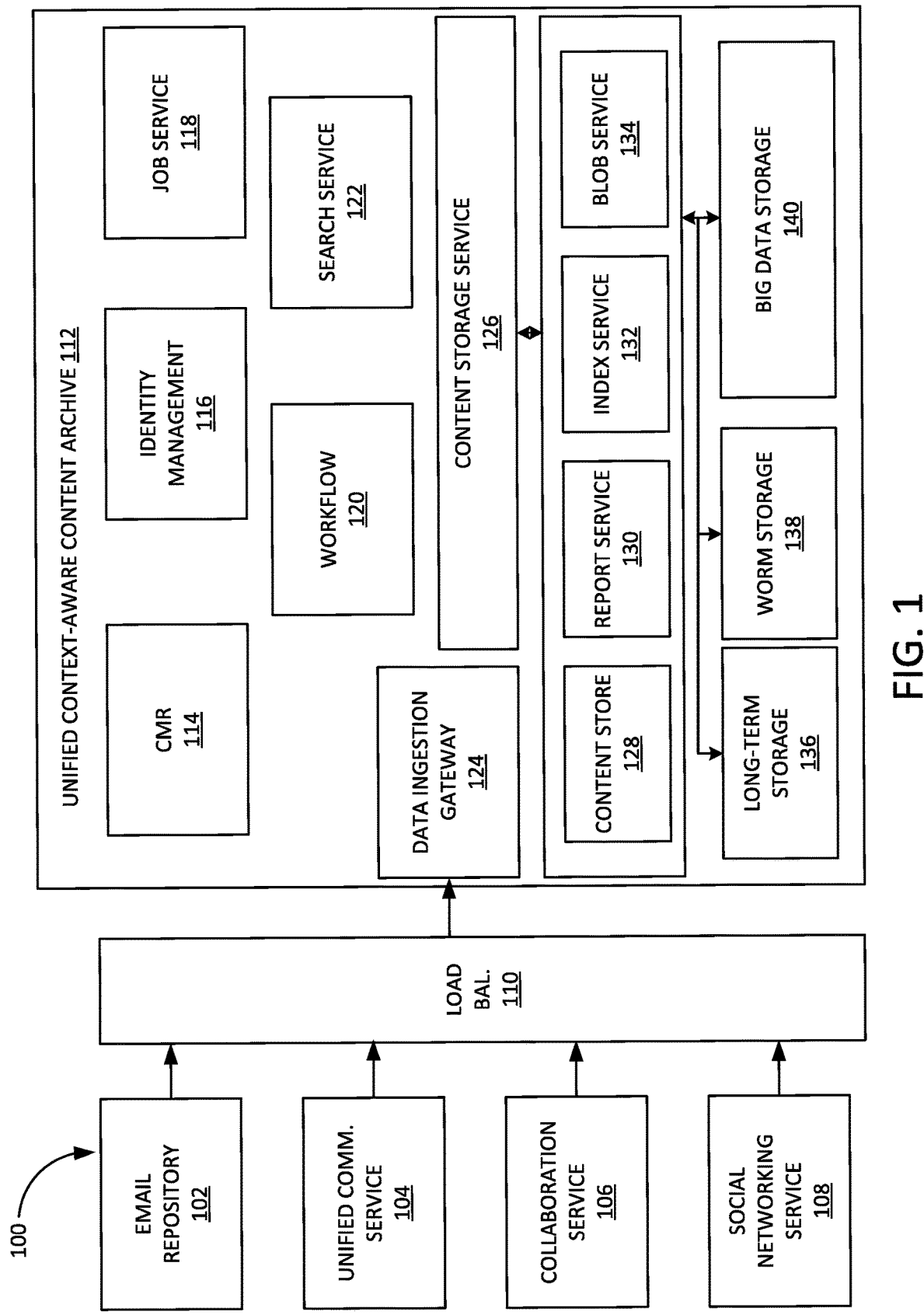
FIG. 1 is a block diagram of an electronically stored information (ESI) environment.

The present disclosure generally relates to supervising communications, and more particularly to a multi-system environment that facilitates a more efficient supervision process.

In certain embodiments, the environment may include a communication capture system, an archive system, and a supervision system. The communication capture system may receive communications from multiple communication modalities. The communications from one or more communication modalities may be determined to be a single interaction. For example, a first communication may be sent from a first user to a second user, and a second communication may be sent from the second user to the first user in response to the first communication. In such an example, the first communication and the second communication may be designated as an interaction.

The communication capture system may generate a communication object for each communication (or for each interaction), where a structure of a communication object may be consistent across different communication modalities. The communication capture system may store communication objects in the archive system.

The supervision system may access the archive system to determine whether a communication object should be reviewed. For example, the supervision system may identify a policy defining which communication objects to review. Based upon the policy, and in response to communication objects being stored in the archive system, the supervision system may add references to the communication objects to one or more queues, where each queue is indicative of a list of one or more communications that need to be reviewed.

The supervision system may expose (or provide) a user interface (e.g., a graphical user interface (GUI) or an application programming interface (API)) for users to access queues maintained by the supervision system. In one illustrative example, the user interface may be a graphical user interface in the form of a web page. The web page may provide an option to a reviewing device to review a queue that has been assigned to or selected by the reviewing device. Upon selection of the option, the supervision system may identify a reference for a communication object that is the next communication object in the queue.

In some examples, the supervision system may retrieve the communication object using the reference. In such examples, the supervision system may then add information from the communication object to the web page and send the web page to the reviewing device. In other examples, the supervision system may cause, using the reference, the archive system to send information from the communication object to the reviewing device such that the information may be output by the reviewing device.

The information from the communication object may be a representation of an interaction. In some examples, the information may be used to reconstruct portions of one or more communications from the interaction in a viewable form.

The environment described above may facilitate many advantages over current systems. For example, the communication capture system, the supervision system, and any other system may all operate on the same data corpus (i.e., the archive system) instead of using their own repositories.

The communication capture system may also identify specific roles for participants of a communication during a non-email communication. For example, during an instant messaging communication, an initiator, a participant, and an observer may be identified. For another example, during a social networking communication, a poster, a commenter, or a rater (e.g., a user that liked a post) may be identified.

The supervision system may also provide the ability to simultaneously search multiple sections (sometimes referred to as zones) of a communication with one or more different policies for each section. Examples of sections of a communication may include a subject, a body, an attachment, a sender, a receiver, a poster, an encryption type, etc.

The supervision system may also provide the ability to flag a communication by section based upon one or more policies that failed. For example, a communication may have one or more words in a particular section of the communication highlighted due to the one or more words causing the communication to fail a policy.

The supervision system may also allow a user to construct a dynamic policy that includes proximity-based limitations between words, wild cards, fuzzy matching, nested Boolean phrases, or any combination thereof.

The supervision system may also provide multi-level queues. For example, reviewers may be separated into different levels, where a particular communication is reviewed by a first level before a second level. The multi-level queues may provide the ability to escalate up the chain to upper levels for potential violations/questions or de-escalate down to lower levels for another review. When multiple levels are provided, update tags may be added to communications as communications are reviewed. For example, when a reviewer reviews a communication, the reviewer may store a comment with the communication in the archive system such that other reviewers (on the same level and/or a different level than the reviewer) may view the comment.

The supervision system may also provide near real-time reporting of metrics around supervision activities independent of the archive system with the ability to generate custom reports.

The supervision system may provide additional features when presenting communications to a reviewer. For example, indications of facets of the communications may be displayed, each indication including a number of communications that would result from a particular filter. Such facets may be based upon the communications and/or meta data added to the communications due to reviewer action.

When a communication is presented to a reviewer from the archive system, the communication may include information regarding routing headers that indicate a path the communication went when originally sent.

A. Context-Aware Content Archive

As described above, communications may be received by a communication capture system. The communication capture system may then generate communication objects (sometimes referred to as information structures below) for the communications and store the communication object in an archive system. The communication capture system and the archive system may be combined into a single system (e.g., a context-aware content archive) as will be described below in FIG. 1.

FIG. 1 is a block diagram of an electronically stored information (ESI) environment 100. The ESI environment 100 may include email repository 102, unified communications service 104, collaboration service 106, social networking service 108, load balancer 110, and unified context-aware content archive 112. FIG. 1 is merely illustrative of an example and should not limit the scope of the claims. One of ordinary skill in the art may recognize through this disclosure and the teachings presented herein other variations, modifications, and/or alternatives to those embodiments or implementations illustrated in the figures.

Email repository 102 may be representative of one or more hardware and/or software elements from which electronically stored information related to an email communication modality may be obtained. Email repository 102 may provide access to one or more email modality documents and associated metadata. Email repository 102 may act as an email storage service, an email service, an email gateway, or the like. One example of email repository 102 is a computer system running Microsoft Exchange Server from Microsoft Corporation of Redmond, WA In other examples, email repository 102 may include operating systems, such as Microsoft Windows™, UNIX™, and Linux™, and one or more mail transport agents, mail user agents, and the like. Email communications may be stored on email repository 102 or accessibly therefrom in a file, such as an Outlook PST file or mbox file, in a database, or the like.

Unified communications service 104 may be representative of one or more hardware and/or software elements from which electronically stored information related to a unified communication modality may be obtained. The unified communications service 104 may provide access to one or more unified communication modality documents and associated metadata. Unified communications service 104 may provide access to real-time communication services such as instant messaging (chat), presence information, telephony (including IP telephony), video conferencing, data sharing (including web connected electronic whiteboards aka IWB's or Interactive White Boards), call control and speech recognition. Unified communications may be stored on unified communications service 104 or accessibly therefrom in a file, in a database, or the like.

Collaboration service 106 may be representative of one or more hardware and/or software elements from which electronically stored information related to a collaboration communication modality may be obtained. Collaboration service 106 may provide access to one or more collaboration modality documents and associated metadata. Collaboration service 106 communications may be stored on collaboration service 106 or accessibly therefrom in a file, in a database, or the like.

Social networking service 108 may be representative of one or more hardware and/or software elements from which electronically stored information related to a social network communication modality may be obtained. Social networking service 108 may provide access to one or more social networking documents and associated metadata. A social network may be a social structure made up of a set of social actors (such as individuals or organizations) and a complex set of ties (e.g., dyadic or professional/fan ties) between these actors. Social networking service 108 may provide information about the social structure, the social actors, and the ties between the actors. Social networking service 108 may further provide information related to electronic communications made via one or more applications that host the social network.

In various examples, social networking service 108 may provide monitoring in real-time and aggregating "social media" into a communication form that may be managed holistically using compliance protocols for the regulated industries. Accordingly, social media interactions may be collected for general storage and later search-ability. In one example, a social media interaction may include time points of communication events (e.g., an event transcript). Events may be determined corresponding to create, posts, updates, edit, modifications, deletion etc. on artifacts associated with ESI system 100. In another example, events may correspond to a blog, a chat, a video session, an audio recording, an instance message, a tweet, a newly constructed web page on a web site, a phone call, a television feed. These may be classified in real-time as predetermined events such as tweets, news alerts, Facebook posts, linked-in events, etc.

In further examples, social networking service 108 may provide a connection context. For example, social networking service 108 may determine participants involved in the communication that may be mapped to a logical social graph. Social networking service 108 may derive in-band and out-of-band context. In-band for purposes of this disclosure mean contexts within a social media platform, such as Salesforce, LinkedIn, Facebook, Tweeter, MSN, Google+, etc. Social networking service 108 may use a native API to obtain metadata within a social network API. Out-of-band for purposes of this disclosure implies unrelated or disparate interconnects of social media networks (LinkedIn, Facebook, Twitter, etc.). To employ out-of-band information, social networking service 108 may employ normalization of metadata enrichment and aggregation of an information domain. Accordingly, a fuller context may be provided of a participant's inter-connections and intra-connections to other participants across any social network domain. In other words, intra may be more about in-band single social network domain and inter is about using a plurality of social network domains (e.g., the application of across and heterogeneous networks and/or social media platforms, such as Facebook, Tweeter, LinkedIn, Microsoft, Google, Apple, Bloomberg, etc.).

Load balancer 110 may be representative of one or more hardware and/or software elements that distribute the workload of obtaining the different communication modalities from email repository 102, unified communications service 104, collaboration service 106, and social networking service 108 across multiple computers or a computer cluster, network links, central processing units, disk drives, or other resources, to achieve optimal resource utilization, maximize throughput, minimize response time, and avoid overload.

Unified context-aware content archive 112 may be representative of one or more hardware and/or software elements configured to obtain electronically stored information related to multiple communication modalities and store interaction transcripts determined therefrom in a single information structure. In one example of operation, unified context-aware content archive 112 may obtain electronic communications from email repository 102, unified communications service 104, collaboration service 106, and social networking service 108 via load balancer 110. Unified context-aware content archive 112 may obtain electronic communications using a variety of known techniques, such as push or pull mechanisms. In one example, unified context-aware content archive 112 may obtain electronic communications directly or indirectly through a service that monitors electronic communications in real time or in non-real-time.

In various examples, unified context-aware content archive 112 may be configured to receive electronic communications according to the above various communication modalities and processes documents representing the electronic communications to determine interactions between one or more participants. A series of events that form the interactions may be modeled as a single information structure facilitating storage and retrieval. Unified context-aware content archive 112 may store content in a searchable form via normalization into the single information structure that is retrievable based on contexts derived or inferred from the single information structure. Unified context-aware content archive 112 may incorporate a variety of traditional storage mechanisms (e.g., relational databases) and non-traditional storage mechanisms (e.g., Big Data).

In this example, unified context-aware content archive 112 may include content management repository (CMR) module 114, identity management module 116, job service module 118, workflow module 120, search service module 122, data ingestion gateway module 124, content storage service module 126, content store module 128, report service module 130, index service module 132, blob service 134, long-term storage module 136, WORM storage module 138, and big data storage module 140.

CMR module 114 may be representative of one or more hardware and/or software elements configured for managing an organization's content. CMR module 114 may incorporate technology to store and index, classify, search and retrieve objects of all types. CMR module 114 may be used by unified context-aware content archive 112 in the processing of or enrichment of electronic communications, management of data, and the like.

Identity management module 116 may be representative of one or more hardware and/or software elements configured for managing individual identifiers, their authentication, authorization, and privileges within or across system and organization boundaries. Identity management module 116 may be used by unified context-aware content archive 112 in the processing of or enrichment of electronic communications.

Job service module 118 may be representative of one or more hardware and/or software elements configured for managing one or more jobs or tasks. Job service module 118 may be used by unified context-aware content archive 112 in the processing of or enrichment of electronic communications. Workflow module 120 may be representative of one or more hardware and/or software elements configured for managing or orchestrating one or more workflows. Workflow module 120 may be used by unified context-aware content archive 112 in the processing of or enrichment of electronic communications. A workflow may include one or more jobs or tasks. In one example, a workflow includes a communication capture step, an enrichment step that determines information related to the communication, a processing step that transforms or processing information related to the communication, a normalization step that generates a normalized version of the communication, and a storage step that stores the communication in one or more forms.

Search service module 122 may be representative of one or more hardware and/or software elements configured for managing searches related to communications. Search service module 122 may be used by unified context-aware content archive 112 in the indexing and retrieval of electronic communications.

Data ingestion gateway module 124 may be representative of one or more hardware and/or software elements configured for managing the intact of electronic communications from email repository 102, unified communications service 104, collaboration service 106, and social networking service 108. Data ingestion gateway module 124 may provide security features, access control lists, and the like for maintaining the integrity of and records for stored communications.

Content storage service module 126 may be representative of one or more hardware and/or software elements configured for managing the storage and retrieval of normalized electronic communications. Content storage service module 126 may provide a content-agnostic storage system for storing, managing, searching, integration data storage independent solutions using RDBMS, XML Repositories, File Systems, and Key-Value storage; aka Big Data storage.

Content store module 128 may be representative of one or more hardware and/or software elements configured for managing the storage and retrieval of primarily textual information related to electronic communications. Report service module 130 may be representative of one or more hardware and/or software elements configured for managing the generation of reports related to captured, indexed and stored communications. Index service module 132 may be representative of one or more hardware and/or software elements configured for managing the indexing of stored communications. Some examples of indexes may be full-text indices, semantic analysis, topic indices, metadata indices, and the like. Blob service 134 may be representative of one or more hardware and/or software elements configured for managing the storage and retrieval of primarily binary data, such as attachments to emails and instant messages, voicemails, blogs, network posts, and the like.

Long-term storage module 136 may be representative of one or more hardware and/or software elements configured for managing the long-term storage and retrieval of electronic communications. WORM storage module 138 may be representative of one or more hardware and/or software elements configured for managing data in long-term storage. For example, WORM storage module 138 may be a data storage device, a data storage service, or any combination thereof in which information, once written, cannot be modified. This write protection affords the assurance that the data cannot be tampered with once it is written to the device. Big data storage module 140 may be representative of one or more hardware and/or software elements configured for managing data sets with sizes beyond the ability of commonly used software tools to capture, curate, manage, and process the data within a tolerable elapsed time.

In general, unified context-aware content archive 112 may provide for the capturing of multiple forms of communication. Specifically, unified context-aware content archive 112 may provide for domain specific classification of information established around email, unified communication, collaboration, and social networks. In one example, unified context-aware content archive 112 may classify electronic communication mediums into the four distinct aforementioned categories such that they share common characteristics. Some examples of common characteristics are event-base timing signatures (e.g., an event is sourced, injected or derived by corresponding point in time; i.e., time of incident), participants engaging in one or more connected interactions or conversations (e.g., unique correlations of persons may be made via CMR module 114 or identity management module 116 allowing identity mappings to be sourced, derived, or inferred—additionally, mappings may also be derived from social graphs by crawling social networks or connections), linked correlations through time series analysis, linked correlations through participant associations, aggregation/clustering or localization across group membership, and the like.

Unified context-aware content archive 112 may further store the common characteristics of the communication modalities via a normalization process into a single information structure. In various examples, unified context-aware content archive 112 may generate an interaction transcript model ("ITM") based on one or more electronic communications. The model may be an entity that represents one or more interactions between one or more participants according to one or more communication modalities. As discussed above, unified context-aware content archive 112 might not be merely archiving documents associated with electronic communications. Unified context-aware content archive 112 may determine an interaction as a bounded definition of a series or sequence of events derived or inferred from a set of documents.

In one example, the ITM may provide a single point of normalization into unified context-aware content archive 112 for search-ability and expressiveness. The ITM may be tailored for eDiscovery pipelines and other applications. In one example, unified context-aware content archive 112 may implement an extract-transform-load (ETL) process for electronic communications for data enrichment, deconstruction, information partition. Enrichment may enable unified context-aware content archive 112 to reclassify information, inject and enrich metadata, and partition data across specialized medium store. Unified context-aware content archive 112 may further allow for streamed and serialized content into underlying repository suitable for downstream indexable content and analytics.

In various examples, unified context-aware content archive 112 may provide searchable content based on contexts derived or inferred via "Attribute Normalization" across disparate storage system. Unified context-aware content archive 112 may implement or otherwise create and index to allow for conversations correlation between participants and derivations of relationships (participant to messages, participants to participants, message to participants). In one example, unified context-aware content archive 112 may provide for searchable content based on time frames, derivation or inferred contexts via sequenced ordering of events corresponding to each distinct event, derivation or inferred contexts via chronologic events corresponding to each distinct event, and derivation or inferred contexts via linked to participants in question, derivation or inferred contexts via term association or referenced in messages or binary artifacts such as attachments, archive resources (tar, gzip, b2, etc.), derivation or inferred contexts via shallow and deep analytics requiring data and process mining techniques, and the like.

In various examples, unified context-aware content archive 112 may determine one or more interaction contexts. Unified context-aware content archive 112 may capture, model, derive, synthesize, archive, and visualize interactions through use of heuristics and algorithms using time-series and semantic analysis to capture, archive, and search for business records based on contexts of time-stamp, and person-based identity mapping. An interaction context may help derive or infer additional information, such as event signified by key attributes such as timestamp, a global unique identification, a sequence number, a modality of event signifying whether it is open or closed, information derived or inferred by a person's identity, derived or inferred social graphs based on communication connections between participants (i.e., linked interactions), and the like. An interaction context may further help derive or infer information such as expressiveness of an event correlating to the interaction by means of metadata injection for data in motion, data at rest, and metadata tagging, meta-meta models, metadata for identity mapping, metadata for messages, and data enrichment via flow injection techniques. Injection may happen at live traffic capture, proxy capture using non-governed devices, network events, transport flows, and application flows.

In some examples, unified context-aware content archive 112 may be distributed such that it is spread across multiple servers. By being distributed, unified context-aware content archive 112 may search in parallel. In some examples, unified context-aware content archive 112 may be divided into logical shards, such that a first shard is on a first server and a second shard is on a second server. In such examples, the logical shards may be divided based on date ranges.

Figure 2:
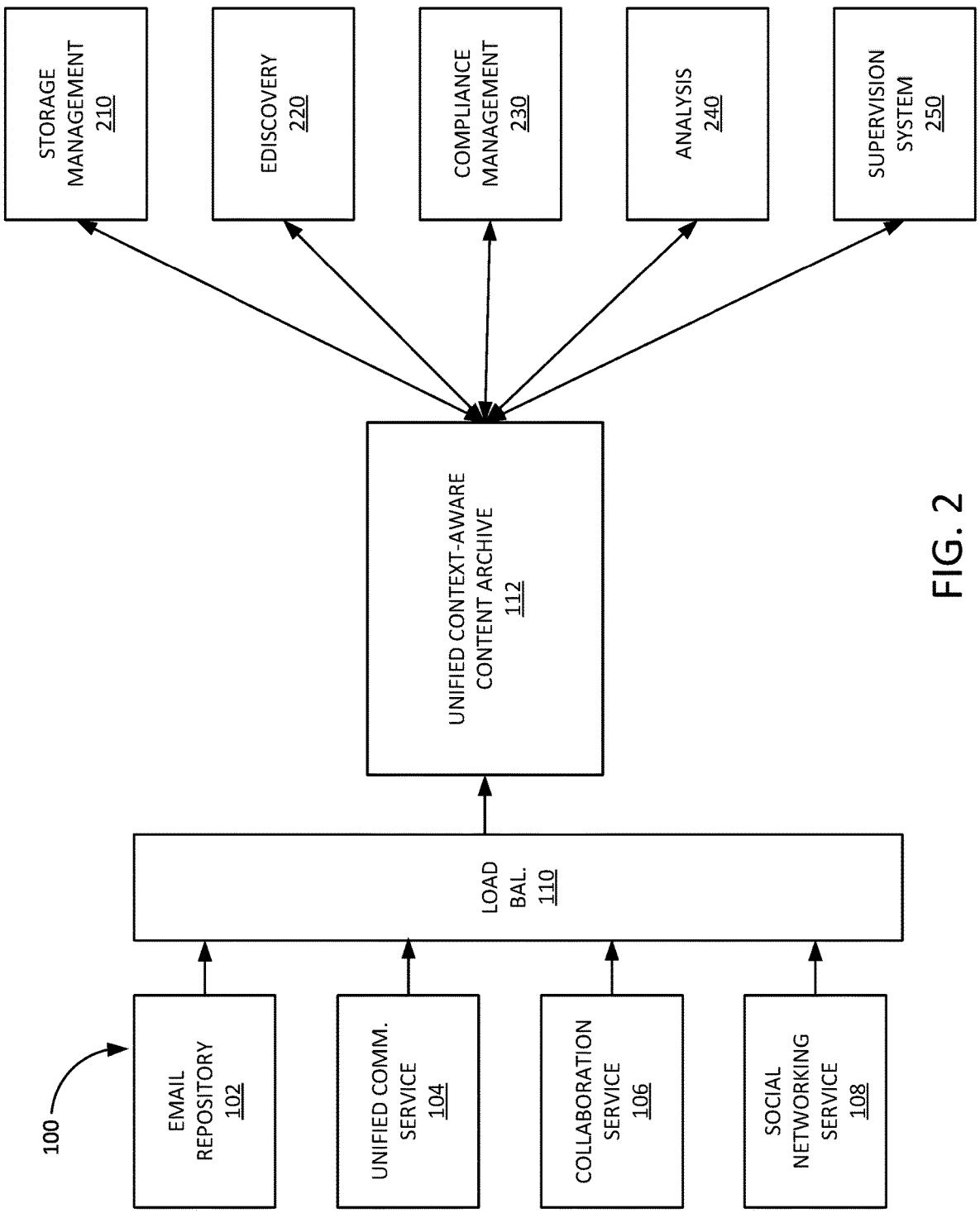
FIG. 2 is a block diagram illustrating different applications of an electronically stored information (ESI) environment.

FIG. 2 is a block diagram illustrating different applications of the ESI environment of FIG. 1. In this example, unified context-aware content archive 112 may be deployed in the cloud. Communication modality infosets and business record events may be sent to unified context-aware content archive 112 using a variety of protocols, such as HTTP/S Transport and SMTP Transport for Email Journal. The communication modality infosets may undergo a normalization process by unified context-aware content archive 112 to unify the infoset into a coherent structure that represents an interaction transcript model ("ITM"). As discussed above, unified context-aware content archive 112 may include one or more engines that allow for data enrichment, data partitioning and segregation into underlying storage medium, and data indexing whereby content index is generated based on data domain context.

In various examples, unified context-aware content archive 112 may be managed by storage management module 210. Storage management module 210 may represent hardware and/or software elements configured to manage aspects of the operation of unified context-aware content archive 112.

In some embodiments, unified context-aware content archive 112 may be integrated with eDiscovery module 220, compliance management module 230, analysis module 240 and supervision system 250. eDiscovery module 220 represents hardware and/or software elements configured for managing eDisovery processes, such as an identification phase when potentially responsive documents are identified for further analysis and review, a preservation phase where data identified as potentially relevant is placed in a legal hold, a collection phase where once documents have been preserved, data may be transferred for processing (e.g., by legal counsel) to determine relevance and disposition, a processing phase where data is prepared to be loaded into a document review platform, a review phase where documents are reviewed for responsiveness to discovery requests and for privilege, and a production phase. In one aspect, eDiscovery module 220 may interface directly with the search capabilities and aggregated results provided by unified context-aware content archive 112.

Compliance management module 230 may be representative of one or more hardware and/or software elements configured for managing compliance requirements faced by an organization. In one example, compliance management module 230 may interface directly with the search capabilities and aggregated results provided by the unified context-aware content archive 112.

Analysis module 240 may be representative of one or more hardware and/or software elements configured for analyzing the stored information. In some examples, a variety of analytics may be performed to determine information related to communications, modalities, participants, contexts, and the like.

Supervision system 250 may be representative of one or more hardware and/or software elements configured to allow users to review communications stored in unified context-aware content archive 112, as further described below.

B. Processing Performed by a Supervision System

As described above, techniques are provided for implementing a supervision system for review of one or more communications associated with an enterprise. The supervision system may be configured to identify the one or more communications in an archive system (e.g., unified context-aware content archive 112).

In some examples, a communication may be identified for review according to one or more policies. A policy may indicate criteria that are defined by an enterprise that indicate a communication that should be reviewed. In some examples, the policy may be defined to capture communications that are against the law. In other examples, the policy may be defined to capture communications that violate one or more rules set by an enterprise. In other examples, the policy may be defined to capture communications that are of interest to the enterprise.

The policy may cause a communication to be identified for review based upon one or more participants of the communication, a time of the communication, a context of the communication (e.g., one or more other communications that are associated with the communication), one or more words in the communication, a subject of the communication (e.g., using machine learning a subject or topic of a communication may be determined), or any combination thereof.

The policy may be defined by a lexicon. A lexicon may include one or more words and one or more proximity indicators. For example, a lexicon may be "Jonathan Rudolph." For another example, the word "Jonathan" may be associated with a proximity indicator of three words with the word "Rudolph" to indicate to identify a communication with Jonathan within three words of Rudolph. For another example, a word may be identified to be in front of or behind another word. For another example, a lexicon may identify the lack of a word (e.g., exclude free lunch). One or more of the previous examples may be combined when defining the policy.

After a communication is identified by the policy, the communication may be added (e.g., assigned or put in) to a queue. The queue may be used to organize communications to be reviewed. The queue may include one or more communications from one or more communication channels (e.g., email, instant message from one or more different channels (such as AIM, Yahoo, and Link), text message, Internet posting, document from a collaboration product, a SharePoint connection, social connection (e.g., information from Facebook, Twitter, and/or LinkedIn), etc.). In such examples, a user may have access to a queue so that the user may review whether the one or more communications meet the rules of the enterprise.

In some examples, the queue may include communications associated with a subject or topic. In such examples, machine learning may be performed on a communication to determine a subject or a topic of the communication. In other examples, the communications may be divided based on a common attribute (e.g., phrase, participant, etc.).

In some examples, the queue may include one or more levels. Each level may include one or more communications of the queue and may be assigned to one or more users for review. In some examples, a different set of one or more users may be assigned to each level.

In some examples, a user may indicate that the user is responsible for reviewing (sometimes referred to as claiming) a communication in a queue. When a user views the queue in a user interface, the user interface may indicate one or more items that another user has not claimed. In some examples, the user interface may display items that are new in relation to the last time the user viewed the user interface.

In some examples, the user interface may provide navigation between one or more communications. In some examples, the navigation may be based on one or more particular communication channels. For example, the navigation may be limited to communications that were sent using a particular communication channel. In other examples, the navigation may be based on one or more policies. For example, the navigation may be limited to communications that were sent identified based on a policy. In some examples, if there were multiple portions of a communication identified, the user interface may provide navigation to each portion. In some examples, the user interface may allow a user to search for terms within all of the communications. In some examples, the search for terms may be limited based one or more factors (e.g., a timeframe, a group of recipients, etc.). In some examples, the user interface may display one or more other communications that are associated with a communication identified for review. The one or more other communications may provide context for the communication identified for review.

In some examples, when the communications have been divided into groups, one or more groups of communications may be analyzed to determine one or more common words that are included in a group of communications. In such examples, a common word may be a word that is found in a particular number of communications in a group of communications. In some examples, the one or more common words may be analyzed in relation to a separate number of communications to determine whether a common word of the one or more common words is uncommon among the separate number of communications. A person of ordinary skill in the art, based on this disclosure, will realize how to define a common word and an uncommon word. For one illustrative example, a common word might be a word that appears in 50% of the communications and an uncommon word might be a word that appears in less than 1% of the communications. In some examples, when a common word in a first group of communications is determined to be uncommon in a second group of communications, other communications (including communications in the second group) that include the common word may be identified for review.

In some examples, the supervision system may further identify similar communications for review based on one or more reviewed communications (e.g., a communication that has been reviewed using the supervision system). In such examples, the similar communications may be identified when a similar communication includes at least one common attribute to a reviewed communication. For examples, the similar communication and the reviewed communication may be from the same participant, related to the same topic, or include some other similar attribute of a communication. In other examples, when a reviewer identifies a communication as violating a rule of an enterprise, the supervision system may add one or more additional communications to the queue based on the communication. In other examples, the supervision system may show one or more additional communications when a viewer selects a communication in a queue. In such examples, the one or more additional communications may be related to the communication.

In some examples, during review, one or more words may be identified as relevant for review. For example, different abbreviations or slang may be identified as important and the archive may identify additional communications with the abbreviations or slang. The additional communications may be added to a queue for review.

In some examples, a history of review for a communication may be tracked. The history may include if the communication was identified for review, why the communication was identified for review, events that have occurred with the communication since the communication was identified for review, other communications associated with the communication that were either identified for review or determined to violate one or more rules of the enterprise, a user to review the communication, and escalation history of the communication after identified. In some examples, the history of review may be used for indexing communications in the archive system.

Figure 3:
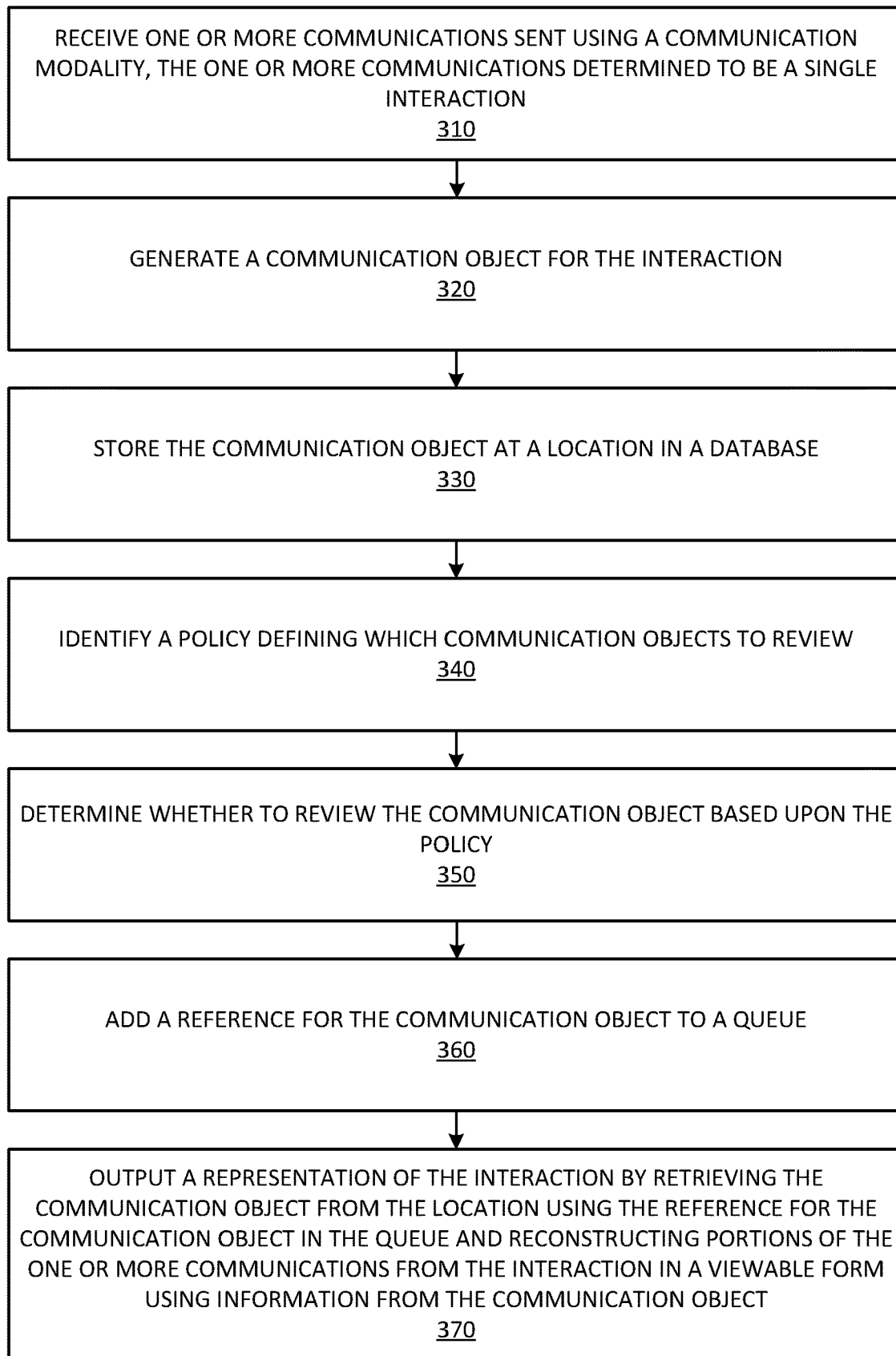
FIG. 3 is a simplified flowchart depicting processing performed by during a supervision process according to certain embodiments.

FIG. 3 is a simplified flowchart depicting processing performed by during a supervision process according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain embodiments, the steps may be performed in some different order or some steps may also be performed in parallel.

At 310, one or more communications are received by a first system (sometimes referred to as a communication capture system). The one or more communications may be sent using a communication modality. The one or more communications may include a first communication and a second communication, where the first communication is sent from a first user to a second user, and where the second communication is sent from the second user to the first user in response to the first communication. In some examples, the one or more communications may be intercepted by the first system when the one or more communications were originally sent from a first user to a second user. In some examples, the first system may be configured to receive communications from multiple communication modalities (e.g., text messages, emails, instant messages blog posts, telephone calls, etc.).

The one or more communications may be determined to be a single interaction. For example, in the context of an email, the one or more communications may be an email, which may constitute a single interaction. In the context of instant messaging, the one or more communications may be multiple messages sent back and forth between a first user and a second user. In the context of a blog, the one or more communications may be based upon a state of the blog after an amount of time has elapsed. For example, an interaction may include all communications associated with the blog from a single day. It should be recognized that other ways to group communications into an interaction may be used.

At 320, a communication object is generated by the first system for the interaction. The communication object may include information that was parsed from the one or more communications. For example, in the context of an email, the communication object may include sender, receiver, subject, body, content from an attachment, an encryption of the email, a time the email was sent, etc. A structure of the communication object may be consistent across different communication modalities. At 330, the communication object is stored by the first system at a location in a database (sometimes referred to as an archive system).

Figure 10B:
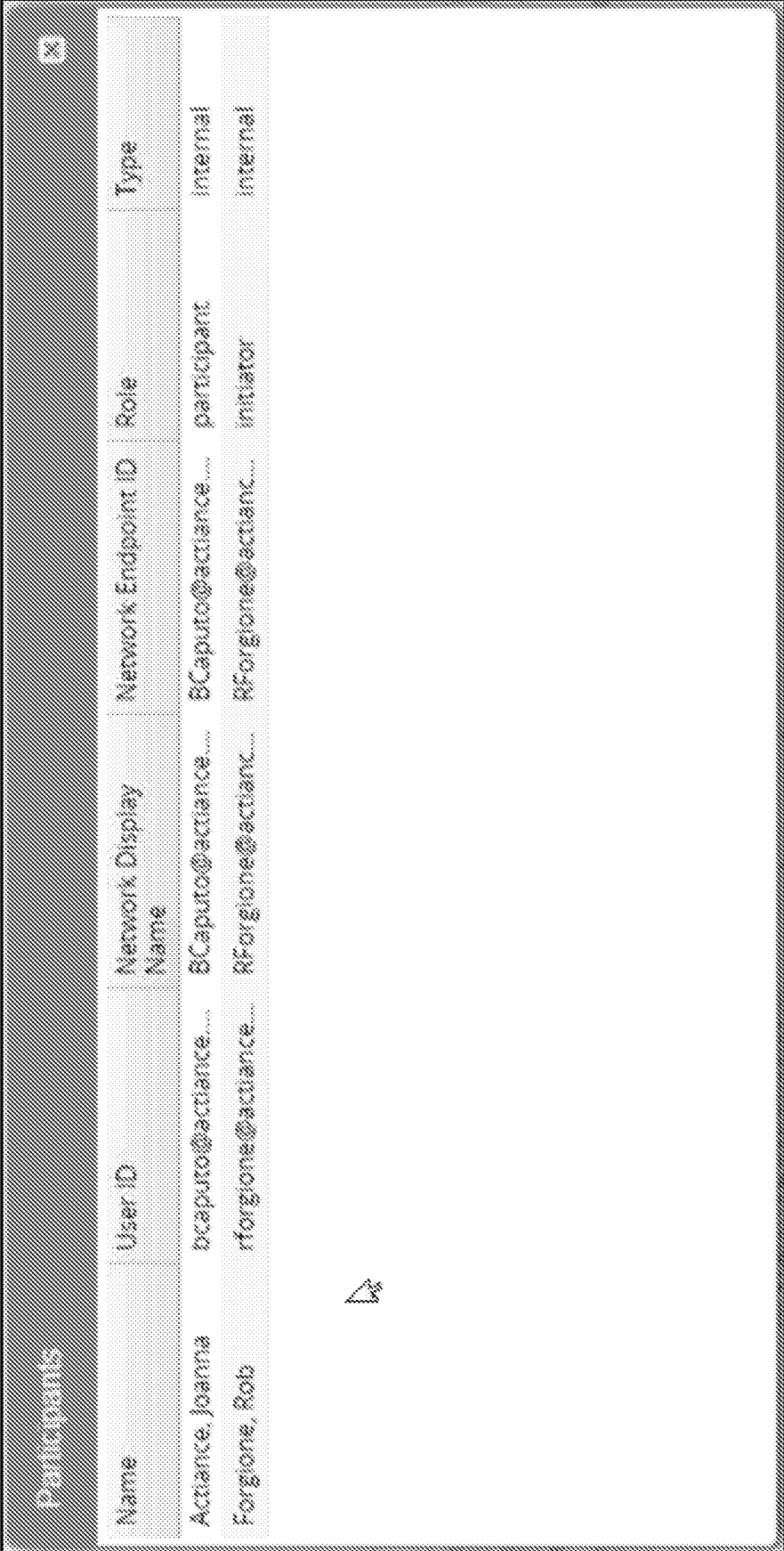
FIG. 10B is an example of a user interface for presenting participants of an instant messaging conversation according to certain embodiments.
Figure 11:
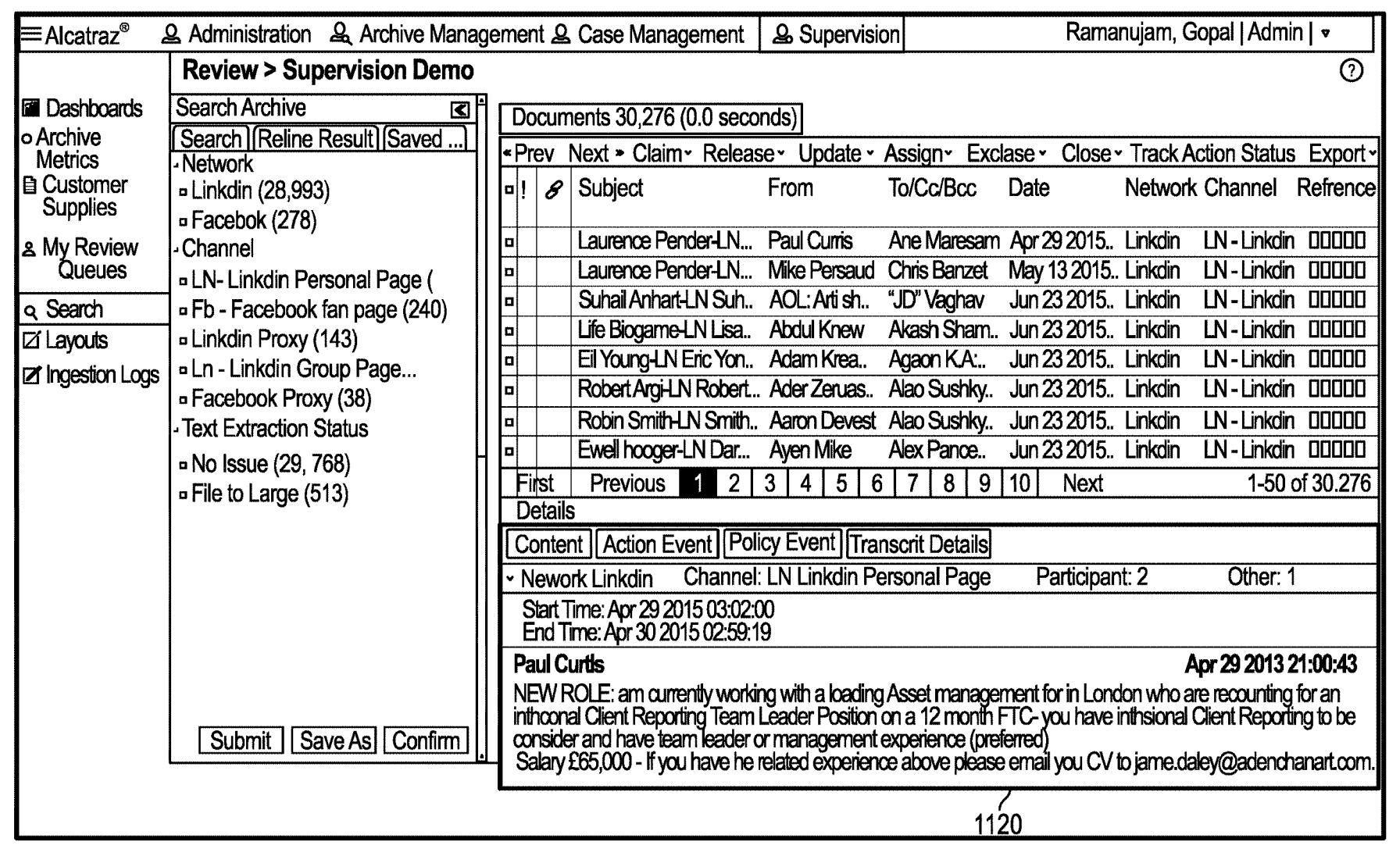

In some examples, the first system may identify specific roles for participants of a communication during a non-email communication. For example, during an instant messaging communication, an initiator, a participant, and an observer may be identified (as illustrated in FIGS. 10A-10B and described below). For another example, during a social networking communication, a poster, a commenter, or a rater (e.g., a user that liked a post) may be identified (as illustrated in FIG. 11 and described below). The specific roles may then be stored with the communication object as meta data.

At 340, a second system (sometimes referred to as a supervision system) identifies a policy defining which communication objects to review. The policy may include search criteria, where a first search criterion of the search criteria applies to a first section of a particular communication, and where a second search criterion of the search criteria applies to a second section of the particular communication.

As described above, the policy may indicate criteria that are defined by an enterprise. The policy may cause a communication to be identified for review based upon one or more participants of the communication, a time of the communication, a context of the communication (e.g., one or more other communications that are associated with the communication), one or more words in the communication, a subject of the communication (e.g., using machine learning a subject or topic of a communication may be determined), or any combination thereof. The policy may be defined by a lexicon. A lexicon may include one or more words and one or more proximity indicators. In addition to proximity indicators a lexicon may include wild cards (i.e., a character that will match any character or sequence of characters in a search), fuzzy matching (i.e., similar words are indicated as matching rather than just exact matches), nested Boolean phrases, or any combination thereof.

At 350, the second system determines whether to review the communication object based upon the policy. In some examples, the determination may simultaneously search multiple sections (sometimes referred to as zones) of the communication object with one or more different policies for each section. Examples of sections of a communication may include a subject, a body, an attachment, a sender, a receiver, a poster, an encryption type, etc.

At 360, in response to determining to review the communication object, the second system adds a reference for the communication object to a queue. Adding the reference for the communication object to the queue may include adding a pointer associated with the communication object to the queue. The pointer may be indicative of the location in the database.

Figure 7:
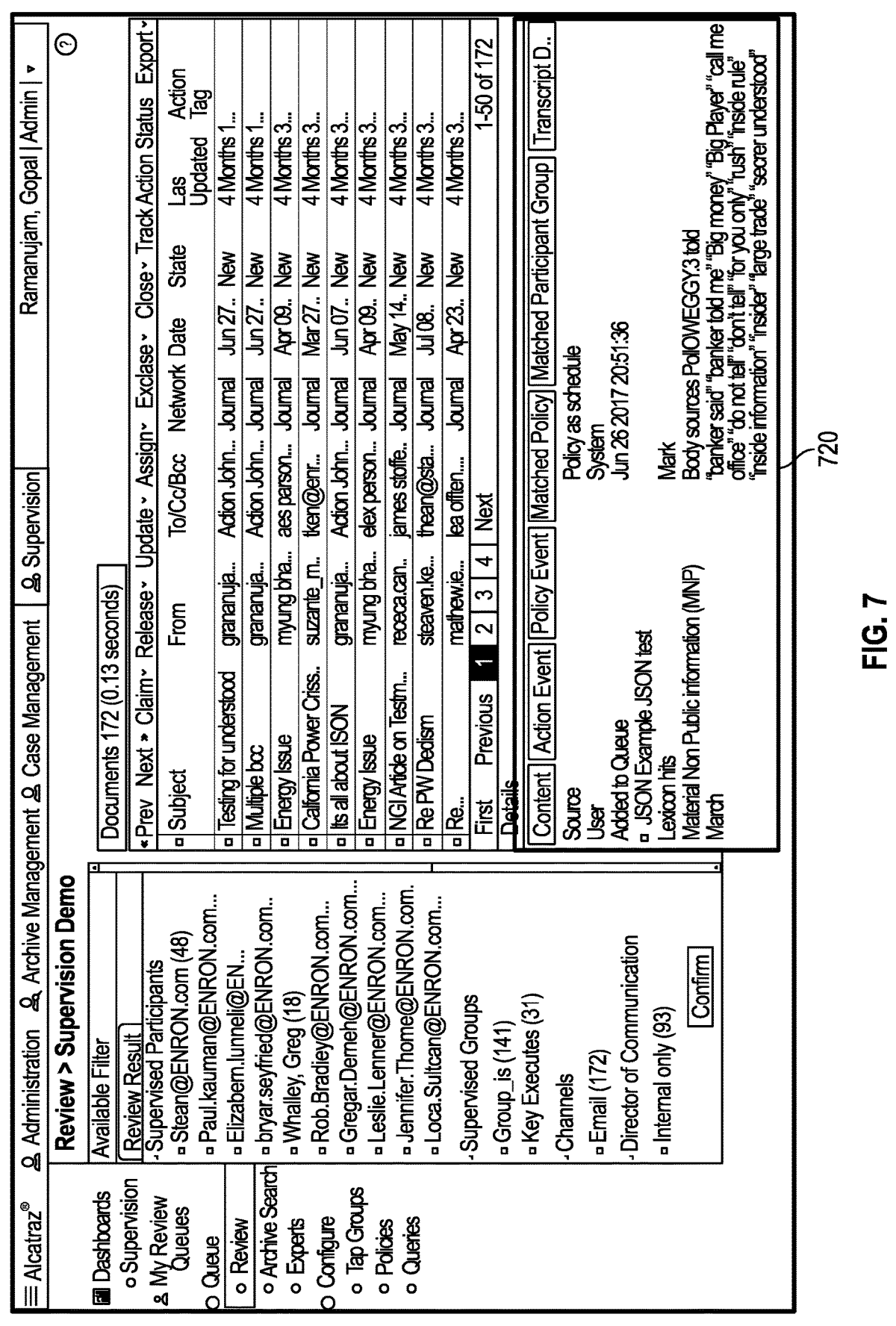

In some examples, in addition to adding the reference to the queue, the second system may add a flag to the communication object stored in the database (as illustrated in FIG. 7 and described below). The flag may indicate the policy that caused the communication object to be added to the queue. The flag may, also or in the alternative, indicate one or more elements in a particular section of the communication object that caused the communication object to fail the policy. In such examples, the flag may be provided to the queue to be presented with the reference for the communication object.

In some examples, the second system may provide multi-level queues. For example, reviewers may be separated into different levels, where a particular communication is reviewed by a first level before a second level. The multi-level queues may provide the ability to escalate up the chain to upper levels for potential violations/questions or de-escalate down to lower levels for another review. When multiple levels are provided, update tags may be added to communications as communications are reviewed. For example, when a reviewer reviews a communication, the reviewer may store a comment with the communication in the archive system such that other reviewers (on the same level and/or a different level than the reviewer) may view the comment.

At 370, the second system outputs a representation of the interaction to a reviewing device. Outputting the representation may include retrieving the communication object from the location using the reference for the communication object in the queue and reconstructing portions of the one or more communications from the interaction in a viewable form using information from the communication object. In some examples, the viewable form may be a native form (e.g., appear as the one or more communications appeared when they were sent in their communication modality) or a human-readable form for the communication modality (e.g., appear so that the one or more communications may be easily viewed rather than as they appeared when they were sent in their communication modality).

Figure 5:
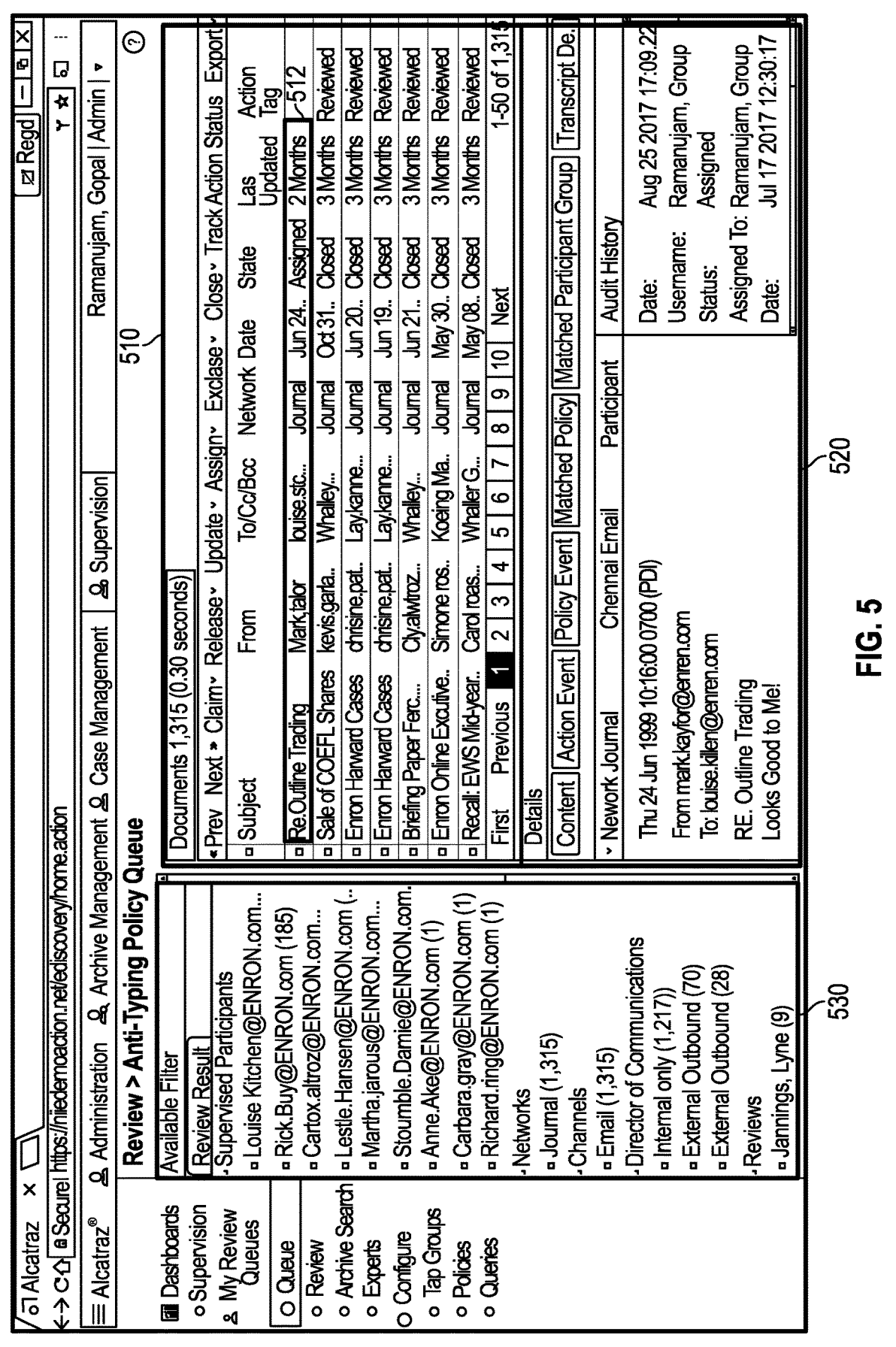
Figure 6:
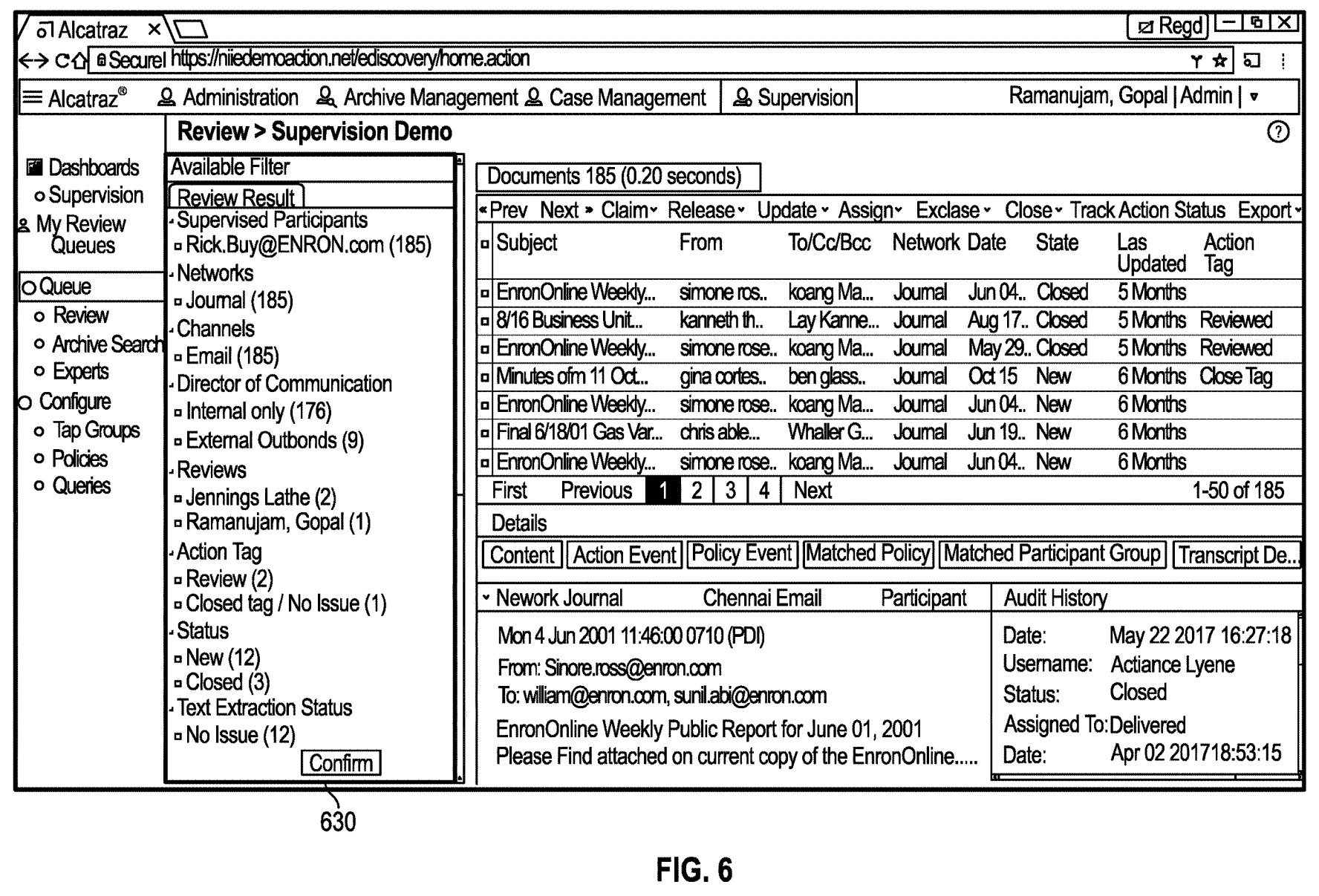

In some examples, the second system may provide additional features when presenting communications to a reviewer. For example, indications of facets of the communications may be displayed, each indication including a number of communications that would result from a particular filter (as illustrated in FIGS. 5 and 6 and further described below). Such facets may be based upon the communications and/or meta data added to the communications due to reviewer action.

When a communication is presented to a reviewer from the second system, the communication may include information regarding routing headers that indicate a path the communication went when originally sent (as illustrated in FIGS. 9A and 9B and described below).

In some examples, prior to the second system outputting the representation, the second system may receive a request to review a next interaction from the queue. The request may be from the reviewing device. In such examples, the representation is output to the reviewing device in response to the request to review the next interaction.

Figure 4:
FIG. 4 is an example of a user interface with multiple queues displayed to a user according to certain embodiments.

In some examples, prior to the second system receiving the request to review the next interaction, the second system may receive a request for a web page associated with the second system. The request may be sent by the reviewing device. In such examples, the second system may identify one or more queues associated with the reviewing device. In response to identifying the one or more queues, the second system may send the web page to the reviewing device, where the web page presents indications of the one or more queues (as illustrated in FIG. 4 and further described below). The request to review the next interaction may be sent in response to a selection of an indication of the queue on the web page by the reviewing device.

C. Exemplary User Interfaces

FIG. 4 is an example of a user interface with multiple queues displayed to a user according to certain embodiments. The user interface may be a web page that is provided by a host system (e.g., a supervision system as described above). Each of the multiple queues may include one or more communication objects that have been added to the queue. Using the user interface, the user may select a queue (e.g., queue 410) such that a request for queue 410 is sent to the host system. In response to receipt of the request, the host system may send a second user interface to the user with information regarding queue 410. An example of the second interface is further described below with reference to FIG. 5.

FIG. 5 is an example of a user interface for review of a queue according to certain embodiments. The user interface in FIG. 5 may be a result of a user selecting a queue in the user interface in FIG. 4. The user interface in FIG. 5 may include first area 510, which includes information regarding multiple communication objects in the queue. For example, first area 510 may include a list of each of the communication objects in the queue. In the example depicted in FIG. 5, the queue includes 1,315 different communication objects (referred to as documents).

In first area 510, each communication object may be associated with information regarding the communication object. For example, communication object 512 may include a subject, a sender, a receiver, a type of network, a date, a state (e.g., a state as assigned by a supervision system, such as whether communication object 512 has been assigned to a reviewer), a time that communication object 512 was last updated, and an action tag (e.g., an action related to the supervision system that was performed regarding communication object 512, such as whether communication object 512 has been reviewed). It should be recognized that each communication object in the queue may include more or less information in first area 510 than depicted in FIG. 5.

The user interface may further include second area 520, which includes additional information regarding a single communication object. For example, second area 520 may include content of one or more communications associated with the communication object. The content may be a portion in a payload of a communication (e.g., text, an image, a video, etc.). Second area 520 may further include information associated with the one or more communications, such as a type of network (e.g., an exchange network, Skype for business, Twitter, LinkedIn, etc.) for the one or more communications, a type of channel (e.g., communication modalities such as email, blogging, instant message, etc.) for the one or more communications, a number of participants for the one or more communications, or the like. Second area 520 may further include a source view for the one or more communications. The source view may present the one or more communications in a native form. The native form may visibly represent a communication as was received originally by a user. Second area 520 may further include audit history for the communication object. The audit history may include information associated with review of the communication object. For example, the audit history may indicate when a last review action occurred for the communication object. Examples of review actions may include "assigned," "reviewed," "closed," "unassigned," "escalated," etc. The audit history may further include a user that the communication object is assigned to for review and any comments, tags, or other information that a reviewer has provided for the communication object. Second area 520 may further include information regarding policies (referred to as "Matched Policy" in FIG. 5) that causes the communication object to be added to the queue (as further discussed below in FIG. 7).

The user interface may further include third area 530, which includes one or more facets for communications objects included in the queue. A facet may correspond to a potential filter that may reduce a number of communication objects that are presented to a user. Each facet may be associated with an indication of a number of communications objects that would be included if a filter corresponding to the facet were applied. I FIG. 6 is an example of a user interface for review of a filtered queue according to certain embodiments. In the example in FIG. 6, the communication objects illustrated in FIG. 5 have been filtered based upon a filter corresponding to a facet. In particular, the communication objects have been filtered such that only communication objects with Rick.But@encron.com as a participant will be in the filtered queue (i.e., the facet was Rick.But@encron.com). The filtered queue may be generated in response to a user selecting a checkbox next to the facet for Rick.But@encron.com. In response to the queue being filtered, other available facets may be updated based upon selection of the facet. For example, some facets may be removed or added and some facets may have an indication of a number of communications objects that would be included updated. The number may be updated to reflect how many communication objects would be left if the communication objects were filtered with both the selected facet and a facet associated with the indication.

FIG. 7 is an example of a user interface for indicating a reason that a communication object was added to a queue according to certain embodiments. The user interface may be presented to a user in response to a user selecting the "Matched Policy" button in one of the interfaces in FIG. 5 or 6.

The user interface in FIG. 7 includes second area 720, which may include information regarding the reason that the communication object was added to the queue. Examples of the information include a source (e.g., an event that caused the communication object to be added to the queue such as a regularly scheduled search of a particular policy), a user that added the communication object to the queue (e.g., a user or a supervision system may add the communication object to the queue), a time that the communication object was added to the queue, a lexicon included in a policy that caused the communication to be added to the queue, and one or more elements from the communication object that caused the communication object to be added to the queue.

Figure 8A:
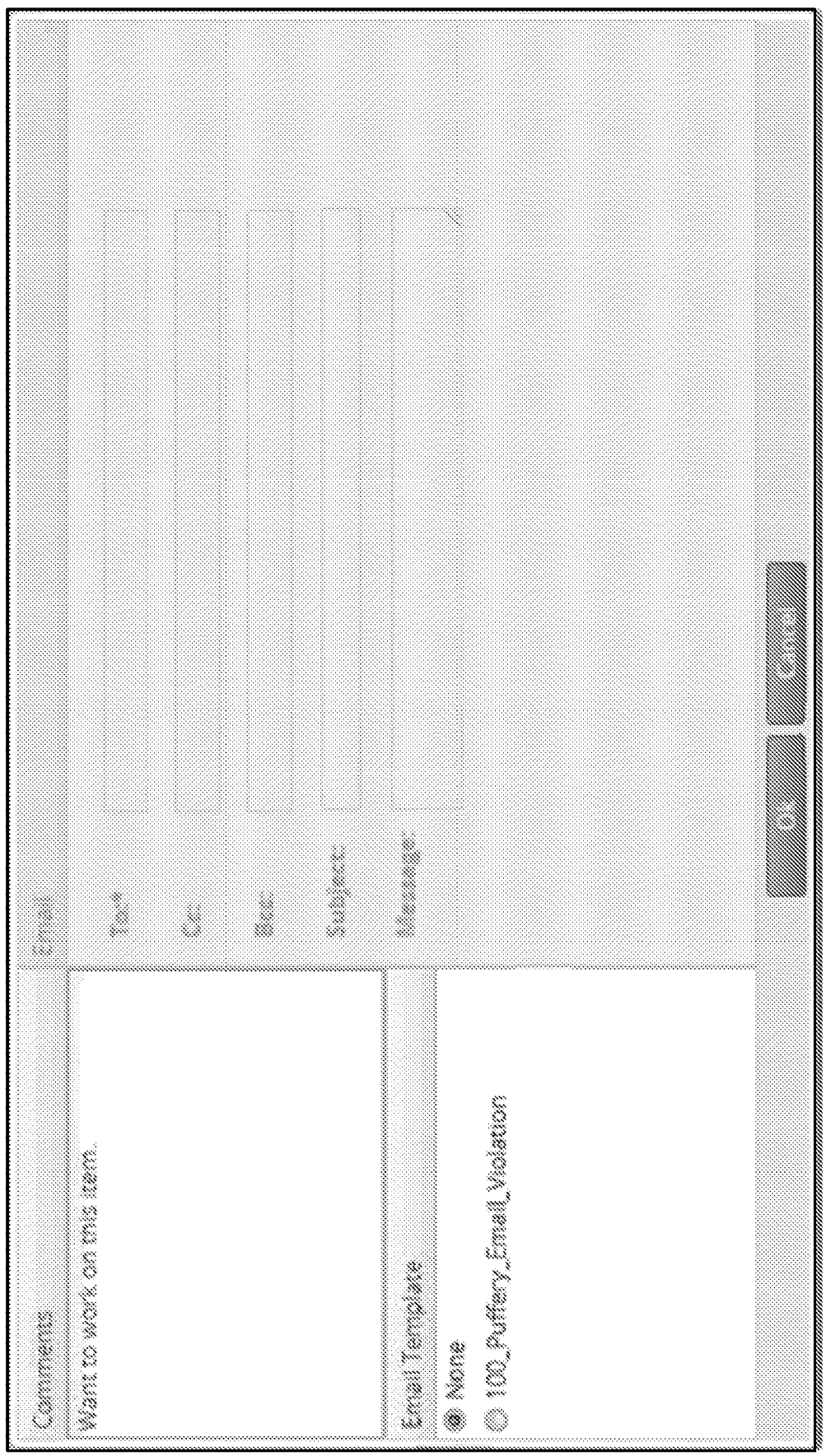
FIGS. 8A-8B is an example of user interfaces for adding an action comment to a communication object according to certain embodiments.
Figure 8B:

FIGS. 8A-8B is an example of user interfaces for adding an action comment to a communication object according to certain embodiments. In particular, a user interface depicted in FIG. 8A may be presented to a user in response to the user indicating that they wish to associate an action comment with the communication object. The action comment may be associated with a communication object that is in need of review (i.e., an action is required). In some examples, reviewers may be forced to leave comments with a minimum # of characters to prevent users from just clicking through communications. Reviewers may also decide to notify the actual senders with email content based on predefined or custom notification templates.

When the user selects the "OK" button in FIG. 8A, a user interface depicted in FIG. 8B may be updated to include the action comment. The user interface depicted in FIG. 8B may correspond to the audit history described above for FIG. 5. The audit history depicted in FIG. 8B may include the action comment. In some examples, the action comment may be visible for a subset of reviewers in a system. For example, the action comment may be set to be visible for reviewers in a level that is the same as the user. For another example, the action comment may be set to be visible for reviewers in a different level than the user (e.g., levels above the level that the user is in). In some examples, the tag and/or the action comment may be stored with the communication object.

Figure 8C:
FIGS. 8C-8D is an example of user interfaces for adding information to a communication object in response to a review of the communication object according to certain embodiments.
Figure 8D:
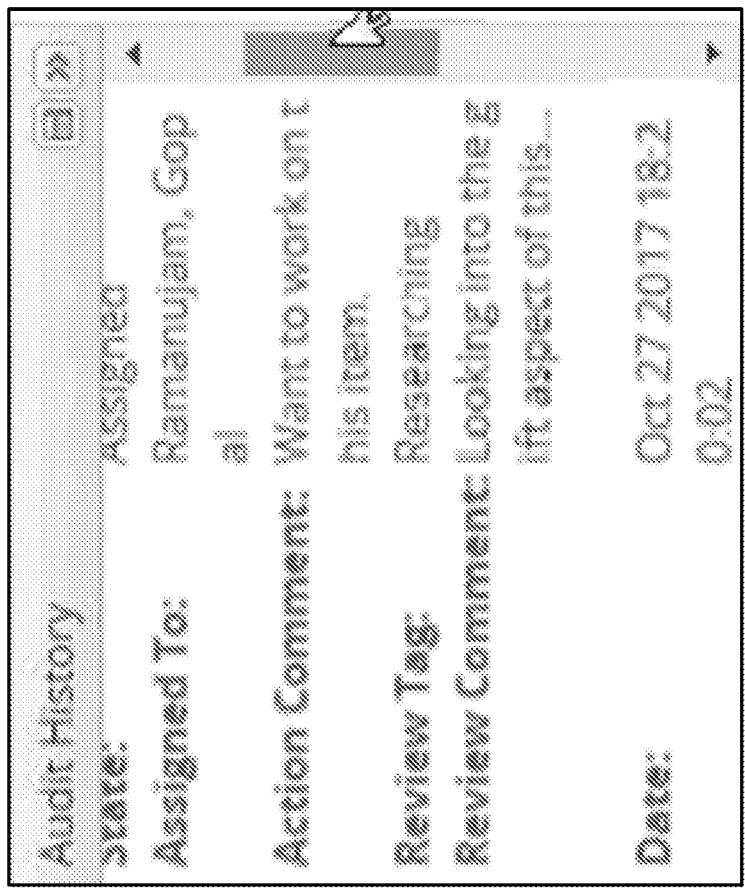

FIGS. 8C-8D are examples of user interfaces for adding information to a communication object in response to a review of the communication object according to certain embodiments. In particular, a user interface depicted in FIG. 8C may be presented to a user in response to the user reviewing the communication object. In some examples, a response may be required when a user reviews the communication object. In such examples, the response may further be required to be a particular number of characters.

The user interface may include an option to add a tag to the communication object. The tag may be a pre-specified parameter that the user may select to associate with the communication object. The user interface may further include an option to add a review comment. The review comment may be one or more words that the user enters in response to the review of the communication object.

When the user selects the "OK" button in FIG. 8C, a user interface depicted in FIG. 8D may be updated to include the tag and/or the review comment. The user interface depicted in FIG. 8D may correspond to the audit history described above for FIG. 5. The audit history depicted in FIG. 8D includes the tag and the review comment. In some examples, the tag and/or the review comment may be visible for a subset of reviewers in a system. For example, the tag and/or review comment may be set to be visible for reviewers in a level that is the same as the user. For another example, the tag and/or review comment may be set to be visible for reviewers in a different level than the user (e.g., levels above the level that the user is in). In some examples, the tag and/or the review comment may be stored with the communication object.

FIG. 9A is an example of a user interface for displaying content from an email associated with a communication object according to certain embodiments. The user interface may be presented to a user in response to a user selecting the "Content" button in one of the interfaces in FIG. 5, 6, or 7. In some examples, the user interface in FIG. 9A may be a default view that is shown to a user whenever a communication object is selected.

The user interface in FIG. 9A includes second area 920, which may include information regarding the content from the email. For example, the content may include a body of the email. The information may further include meta data associated with the email, such as a type of network (e.g., an exchange network, Skype for business, Twitter, LinkedIn, etc.), a type of channel (e.g., a communication modality such as email, blogging, instant message, etc.), a number of participants for the email, a sender of the email, one or more receivers of the email, a time that the email was sent, among other information that is related to the email.

FIG. 9A further includes highlighting 922, which may indicate a hit of a policy in a communication object. Highlighting 922 may automatically be performed by a supervision system when presenting the user interface of FIG. 9A. In some examples, the user interface may allow a user to navigate between hits of one or more policies in the communication object. In such examples, highlighting 922 may move to a second hit when moving from a first hit.

FIGS. 9B-9C is an example of a source view of a communication object for an email according to certain embodiments. The source view may be useful to view actual headers, typically for troubleshooting purposes by an administrator. The source view may include first portion 940. First portion 940 may include sending information for the communication object. Examples of sending information include an identification of a message, a date, a sender, one or more receivers, a subject of the communication object, etc.

The source view may further include second portion 950. Second portion 950 may include routing header information for the communication object. Examples of routing header information include meta data that is appended to a message when the message is routed through various systems before arriving at a receiver. The source view may further include content 960, which may be a body of a communication sent (as described above in FIG. 9A).

FIG. 10A is an example of a user interface for displaying content from one or more messages in an instant messaging conversation associated with a communication object according to certain embodiments. Similar to FIG. 9A, the user interface of FIG. 10A may be presented to a user in response to a user selecting the "Content" button in one of the interfaces in FIG. 5, 6, or 7. In some examples, the user interface in FIG. 10A may be a default view that is shown to a user whenever a communication object is selected.

The user interface in FIG. 10A includes second area 1020, which may include information regarding the content from the messages. For example, the content may include the one or more messages, where each message includes an indication of a time and who sent the message. The information may further include meta data associated with the one or more messages, such as a type of network (e.g., an exchange network, Skype for business, Twitter, LinkedIn, etc.), a type of channel (e.g., a communication modality such as email, blogging, instant message, etc.), a number of participants for the one or more messages, among other information that is related to the email.

FIG. 10A further includes highlighting 1022, which may indicate a hit of a policy in a communication object. Highlighting 1022 may automatically be performed by a supervision system when presenting the user interface of FIG. 10A. In some examples, the user interface may allow a user to navigate between hits of one or more policies in the communication object. In such examples, highlighting 1022 may move to a second hit when moving from a first hit.

The user interface of FIG. 10A may also include one or more user-selectable options for affecting the display of the content. For example, a user-selectable option may change a type of the message (e.g., rich text, plain text, HTML, etc.). For another example, a user-selectable option may choose to hide or show particular communications (e.g., a join or leave communication, a disclaimer communication, or a communication other than a textual communication. The user interface may further include an option to view the participants associated with the communication object, as further described below in FIG. 10B.

FIG. 10B is an example of a user interface for presenting participants of an instant messaging conversation according to certain embodiments. The participants in FIG. 10B do not correspond to the participants in FIG. 10A. The user interface in FIG. 10B may be presented in response to a user's selection of an option to view the participants associated with a communication object. Each participant in the user interface depicted in FIG. 10B may include identification information for the participant (e.g., a name, a user identification, a network display name, a network endpoint identification, etc.). Each participant may also be assigned a role in regards to one or more communications of the communication object. For example, FIG. 10B depicts a participant role and an initiator role. Roles may be automatically assigned to users based upon information associated with a communication. Each participant in the user interface depicted in FIG. 10B may further include a type of the participant (i.e., whether the participant is internal or external to an enterprise).

FIG. 11 is an example of a user interface for displaying content from a social networking page associated with a communication object according to certain embodiments. The social networking page depicted in FIG. 11 is LinkedIn. Similar to that depicted in FIG. 10B, the user interface of FIG. 11 may be presented to a user in response to a user selecting the "Content" button in one of the interfaces in FIG. 5, 6, or 7. In some examples, the user interface in FIG. 11 may be a default view that is shown to a user whenever a communication object is selected.

The user interface in FIG. 11 includes second area 1120, which may include information regarding the content from the social networking page. For example, the content may include posts that were posted on the social networking page, where each post includes an indication of a time and the poster. The information may further include meta data associated with the social networking page, such as a type of network (e.g., an exchange network, Skype for business, Twitter, LinkedIn, etc.), a type of channel (e.g., a communication modality such as email, blogging, instant message, etc.), a number of participants for the social networking among, among other information that is related to the email. In some examples, all content included in second area 1120 may be based upon events that occurred within a set amount of time. For example, second area 1120 may be based upon events from a start time to an end time.

D. Exemplary Computer System

Figure 12:
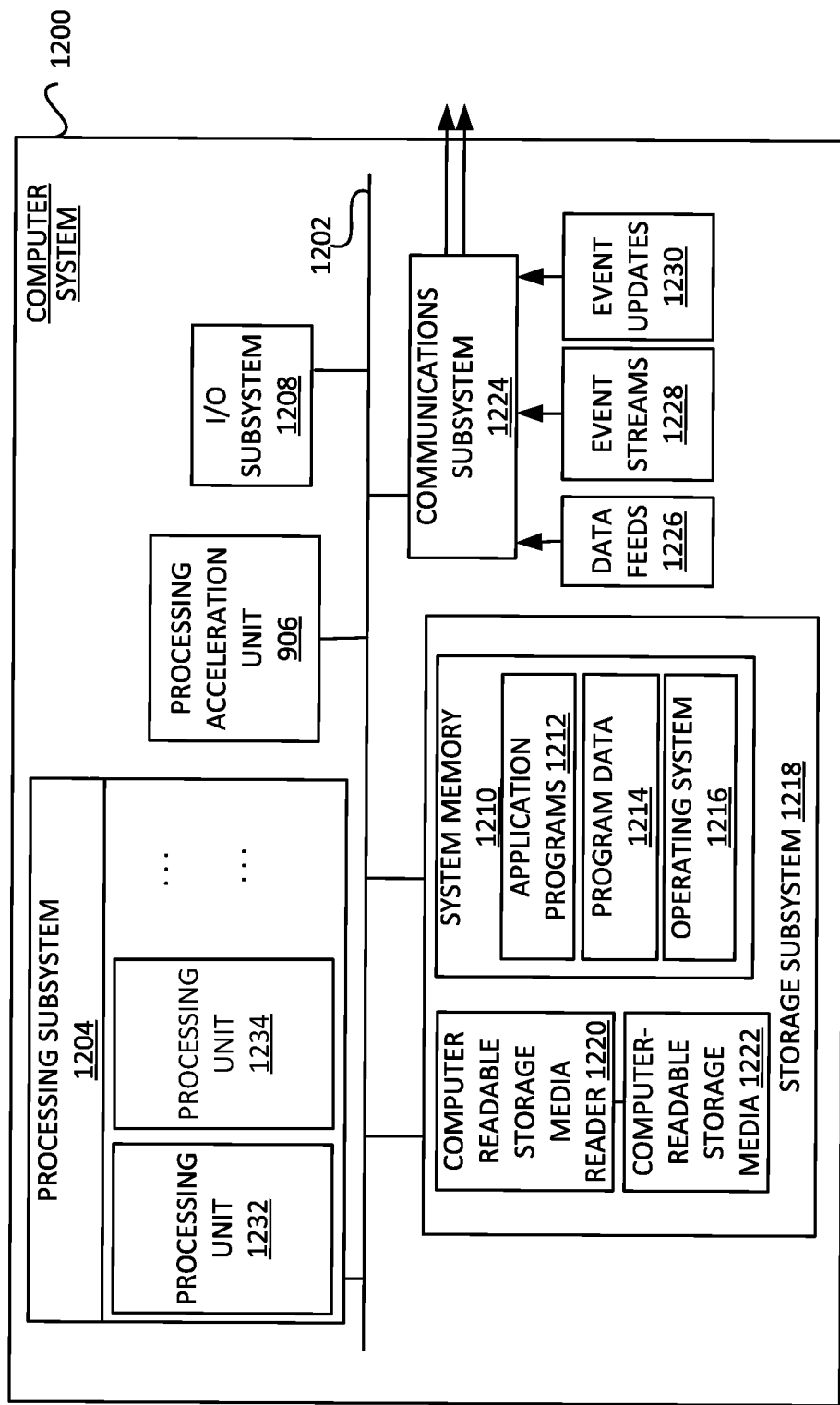
FIG. 12 illustrates an example of a computer system, which may be used to implement certain embodiments described herein.

FIG. 12 illustrates an example of computer system 1200, which may be used to implement certain embodiments described herein. For example, in some embodiments, computer system 1200 may be used to implement any of the systems, servers, devices, or the like described above. As shown in FIG. 12, computer system 1200 includes processing subsystem 904, which communicates with a number of other subsystems via bus subsystem 1202. These other subsystems may include processing acceleration unit 1206, I/O subsystem 1208, storage subsystem 1218, and communications subsystem 1224. Storage subsystem 1218 may include non-transitory computer-readable storage media including storage media 1222 and system memory 1210.

Bus subsystem 1202 provides a mechanism for allowing the various components and subsystems of computer system 1200 to communicate with each other. Although bus subsystem 1202 is shown schematically as a single bus, alternative embodiments of bus subsystem 1202 may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include single core and/or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some embodiments, processing subsystem 1204 may include one or more special purpose co-processors such as graphics processors, digital signal processors (DSPs), or the like. In some embodiments, some or all of the processing units of processing subsystem 1204 may be implemented using customized circuits, such as application specific integrated circuits (ASICs), or field programmable gate arrays (FPGAs).

In some embodiments, the processing units in processing subsystem 1204 may execute instructions stored in system memory 1210 or on computer readable storage media 1222. In various embodiments, the processing units may execute a variety of programs or code instructions and may maintain multiple concurrently executing programs or processes. At any given time, some or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain embodiments, processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices that enable users to control and interact with an input device and/or devices that provide an interface for receiving input using gestures and spoken commands. User interface input devices may also include eye gesture recognition devices that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer system. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some embodiments. Storage subsystem 1218 may store software (e.g., programs, code modules, instructions) that, when executed by processing subsystem 1204, provides the functionality described above. The software may be executed by one or more processing units of processing subsystem 1204. Storage subsystem 1218 may also provide a repository for storing data used in accordance with the teachings of this disclosure.

Storage subsystem 1218 may include one or more non-transitory memory devices, including volatile and non-volatile memory devices. As shown in FIG. 12, storage subsystem 1218 includes system memory 1210 and computer-readable storage media 1222. System memory 1210 may include a number of memories, including (1) a volatile main random access memory (RAM) for storage of instructions and data during program execution and (2) a non-volatile read only memory (ROM) or flash memory in which fixed instructions are stored. In some implementations, a basic input/output system (BIOS), including the basic routines that help to transfer information between elements within computer system 1200, such as during start-up, may typically be stored in the ROM. The RAM typically includes data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and operating system 1216.

Computer-readable storage media 1222 may store programming and data constructs that provide the functionality of some embodiments. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1218 may also include computer-readable storage media reader 1220 that may further be connected to computer-readable storage media 1222. Reader 1220 may receive and be configured to read data from a memory device such as a disk, a flash drive, etc.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1224 may provide wired network connectivity (e.g., Ethernet) in addition to or instead of a wireless interface.

Communication subsystem 1224 may receive and transmit data in various forms. For example, in some embodiments, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as web feeds and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device, a wearable device, a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Some embodiments described herein make use of social networking data that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, including, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product including computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
    receiving, via at least one computing device, at least one first communication sent using a first communication modality;
    receiving, via the at least one computing device, at least one second communication sent using a second communication modality;
    determining, via the at least one computing device, that the at least one first communication and the at least one second communication correspond to a single interaction;
    generating, via the at least one computing device, a communication object for the single interaction in the form of an interaction transcript model, the communication object comprising a plurality of historical communications in a particular structure consistent across communication modalities from the at least one first communication and the at least one second communication;
    determining, via the at least one computing device, a plurality of contexts for the single interaction from the communication object;
    storing, via the at least one computing device, the communication object in a database among a plurality of communication objects; and retrieving, via the at least one computing device, the communication object in response to a search request based on the plurality of contexts.

2. The method of claim 1, further comprising normalizing, via the at least one computing device, the at least one first communication and the at least one second communication into the particular structure to generate the plurality of historical communications.

3. The method of claim 1, further comprising deriving the plurality of contexts from the communication object via attribute normalization.

4. The method of claim 1, further comprising deriving the plurality of contexts from the communication object based on sequencing an ordering of events corresponding to each of the plurality of historical communications.

5. The method of claim 1, further comprising deriving the plurality of contexts from the communication object via chronologic events corresponding to each of the plurality of historical communications.

6. The method of claim 1, further comprising deriving the plurality of contexts from the communication object based on participants in the single interaction.

7. A system comprising:
a data store; and
at least one computing device in communication with the data store, wherein the at least one computing device is configured to:
receive at least one first communication sent using a first communication modality;
receive at least one second communication sent using a second communication modality;
determine that the at least one first communication and the at least one second communication correspond to a single interaction;
generate a communication object for the single interaction in the form of an interaction transcript model, the communication object comprising a plurality of historical communications in a particular structure consistent across communication modalities from the at least one first communication and the at least one second communication;
determine a plurality of contexts for the single interaction from the communication object;
store the communication object in the data store with a plurality of different communication objects; and
retrieve the communication object in response to a search request based on the plurality of contexts.

8. The system of claim 7, wherein the at least one computing device is further configured to receive a search for one or more terms against all communications stored in the data store, wherein the communication object is retrieved based on the one or more terms.

9. The system of claim 7, wherein the single interaction comprises as a bounded definition of a series of events derived from a set of documents, the set of documents comprising the at least one first communication and the at least one second communication.

10. The system of claim 7, wherein the at least one computing device is further configured to:
extract the communication object from the data store;
transform the communication object by performing data enrichment to generate an enriched communication object; and
load the enriched communication object into the data store.

11. The system of claim 10, wherein the at least one computing device is further configured to transform the communication object by deconstructing and partitioning information in the communication object.

12. The system of claim 10, wherein the data store comprises a first database and a second database, the communication object is stored in the first database, and the enriched communication object is stored in the second database.

13. The system of claim 7, wherein the data store comprises a context-aware content archive.

14. A non-transitory computer-readable medium embodying a program that, when executed by at least one computing device, causes the at least one computing device to:
receive at least one first communication sent using a first communication modality;
receive at least one second communication sent using a second communication modality;
determine that the at least one first communication and the at least one second communication correspond to a single interaction;
generate a communication object for the single interaction in the form of an interaction transcript model, the communication object comprising a plurality of historical communications in a particular structure consistent across communication modalities from the at least one first communication and the at least one second communication;
determine a plurality of contexts for the single interaction from the communication object;
store the communication object in a database among a plurality of communication objects; and
retrieve the communication object in response to a search request based on the plurality of contexts.

15. The non-transitory computer-readable medium of claim 14, wherein the program further causes the at least one computing device to
receive metadata via an application programming interface from a social network; and
generate at least one context of the plurality of contexts based on the metadata.

16. The non-transitory computer-readable medium of claim 14, wherein the program further causes the at least one computing device to store a comment from a reviewer with the communication object in the database.

17. The non-transitory computer-readable medium of claim 14, wherein the program further causes the at least one computing device to:
determine to review the communication object based upon a policy file; and
in response to determining to review the communication object, add a reference for the communication object to a first level queue for review.

18. The non-transitory computer-readable medium of claim 17, wherein the program further causes the at least one computing device to add the reference for the communication object to a second level queue for escalated review based on the review of the communication object from the first level queue.

19. The non-transitory computer-readable medium of claim 14, wherein the program further causes the at least one computing device to determine that the at least one first communication and the at least one second communication correspond to the single interaction based on event-based timing signatures by determining correlations of persons in the at least one first communication and the at least one second communication.

20. The method of claim 1, further comprising outputting, via the at least one computing device, the communication object to a reviewing device.

* * * * *